US011822391B2

(12) United States Patent
Kwak et al.

(10) Patent No.: US 11,822,391 B2
(45) Date of Patent: *Nov. 21, 2023

(54) FLEXIBLE DISPLAY DEVICE AND METHOD OF CONTROLLING SAME

(71) Applicant: SAMSUNG ELECTRONICS CO., LTD., Suwon-si (KR)

(72) Inventors: Ji-yeon Kwak, Seoul (KR); Kyung-a Kang, Seoul (KR); Hyun-jin Kim, Seoul (KR); Nipun Kumar, Suwon-si (KR); Chang-Soo Lee, Seosan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,819

(22) Filed: Nov. 28, 2022

(65) Prior Publication Data
US 2023/0092820 A1 Mar. 23, 2023

Related U.S. Application Data

(63) Continuation of application No. 17/066,795, filed on Oct. 9, 2020, now Pat. No. 11,513,561, which is a (Continued)

(30) Foreign Application Priority Data

Aug. 1, 2012 (KR) .................. 10-2012-0084512

(51) Int. Cl.
G06F 1/16 (2006.01)
G09G 5/00 (2006.01)
(Continued)

(52) U.S. Cl.
CPC .......... *G06F 1/1652* (2013.01); *G06F 1/1622* (2013.01); *G06F 3/14* (2013.01);
(Continued)

(58) Field of Classification Search
None
See application file for complete search history.

(56) References Cited

U.S. PATENT DOCUMENTS 6,061,062 A 5/2000 Venolia
8,502,788 B2 8/2013 Cho
(Continued)

FOREIGN PATENT DOCUMENTS

CN 101689065 A 3/2010
CN 101739171 A 6/2010
(Continued)

OTHER PUBLICATIONS

Communication dated Sep. 20, 2016, issued by the State Intellectual Property Office of the People's Republic of China in Chinese Patent Application No. 201380048995.2.
(Continued)

*Primary Examiner* — Krishna P Neupane
(74) *Attorney, Agent, or Firm* — Sughrue Mion, PLLC

(57) ABSTRACT

A flexible display device is provided. The flexible display device includes: a display; a sensor configured to detect at least one rolling characteristic in response to the display being rolled; and a controller configured to perform a first function of the flexible display device based on the detected at least one rolling characteristic.

14 Claims, 32 Drawing Sheets

Related U.S. Application Data continuation of application No. 16/298,104, filed on Mar. 11, 2019, now Pat. No. 10,802,544, which is a continuation of application No. 14/419,130, filed as application No. PCT/KR2013/006951 on Aug. 1, 2013, now Pat. No. 10,241,542.

(51) Int. Cl.
| | |
|---|---|
| *G06F 3/14* | (2006.01) |
| *H04M 1/02* | (2006.01) |
| *G09F 9/30* | (2006.01) |
| *G09G 5/373* | (2006.01) |
| *G09F 9/00* | (2006.01) |

(52) U.S. Cl.
CPC .............. *G06F 3/1438* (2013.01); *G09F 9/00* (2013.01); *G09F 9/301* (2013.01); *G09G 5/003* (2013.01); *G09G 5/373* (2013.01); *H04M 1/0268* (2013.01); *G06F 2203/04102* (2013.01); *G09G 2300/023* (2013.01); *G09G 2320/08* (2013.01); *G09G 2340/04* (2013.01); *G09G 2340/14* (2013.01); *G09G 2340/145* (2013.01); *G09G 2354/00* (2013.01); *G09G 2380/02* (2013.01)

(56) References Cited

U.S. PATENT DOCUMENTS

| | | | |
|---|---|---|---|
| 8,922,531 | B2 | 12/2014 | Lee |
| 8,928,580 | B2 | 1/2015 | Hwang et al. |
| 9,451,064 | B2 | 9/2016 | Hwang et al. |
| 2008/0303782 | A1 | 12/2008 | Grant |
| 2010/0011291 | A1 | 1/2010 | Nurmi |
| 2010/0056223 | A1* | 3/2010 | Choi ............... G06F 1/1686 455/566 |
| 2010/0060548 | A1* | 3/2010 | Choi ............... H04M 1/0268 345/1.3 |
| 2010/0117975 | A1 | 5/2010 | Cho |
| 2010/0164888 | A1* | 7/2010 | Okumura ......... G06F 1/1626 345/173 |
| 2010/0164973 | A1 | 7/2010 | Huitema et al. |
| 2010/0182288 | A1 | 7/2010 | Misawa |
| 2011/0057873 | A1 | 3/2011 | Geissler et al. |
| 2011/0084898 | A1 | 4/2011 | Ebbeling et al. |
| 2011/0095975 | A1 | 4/2011 | Hwang et al. |
| 2011/0187681 | A1 | 8/2011 | Kim et al. |
| 2011/0227822 | A1 | 9/2011 | Shai |
| 2012/0038613 | A1 | 2/2012 | Choi |
| 2013/0169520 | A1 | 7/2013 | Cho |
| 2013/0285922 | A1 | 10/2013 | Alberth |
| 2013/0335311 | A1* | 12/2013 | Kim .................. G06F 3/01 345/156 |
| 2014/0002419 | A1* | 1/2014 | Thorson .......... G06F 1/1626 345/175 |
| 2015/0119112 | A1 | 4/2015 | Hwang et al. |

FOREIGN PATENT DOCUMENTS

| | | |
|---|---|---|
| CN | 102055821 A | 5/2011 |
| CN | 102141878 A | 8/2011 |
| CN | 102436784 A | 5/2012 |
| EP | 2192750 A2 | 6/2010 |
| EP | 2315186 A2 | 4/2011 |
| JP | 2008-171148 A | 7/2008 |
| KR | 10-2010-0052227 A | 5/2010 |
| KR | 10-2011-0028650 A | 3/2011 |
| KR | 10-2011-0088872 A | 8/2011 |
| KR | 10-2011-0133861 A | 12/2011 |
| KR | 10-2012-0015890 A | 2/2012 |
| RU | 2010142156 A | 4/2012 |
| WO | 2009/067013 A1 | 5/2009 |
| WO | 2010/004080 A1 | 1/2010 |
| WO | 2012/052803 A1 | 4/2012 |

OTHER PUBLICATIONS

Communication dated Nov. 21, 2019 by the India Intellectual Property Office in Indian Patent Application No. 1575/DELNP/2015.
Communication dated Nov. 17, 2016, issued by the Federal Service for Intellectual Property in Russian Patent Application No. 2015106920.
Communication dated Aug. 30, 2019 by the Korean Intellectual Property Office in Korean Patent Application No. 10-2012-0084512.
Communication from the Russian Patent Office dated Apr. 20, 2016 in a Russian Application N. 2015106920/08.
Communication dated Jun. 2, 2017, issued by the State Intellectual Property Office of P.R. China in Chinese Application No. 201380048995.2.
Communication dated Jul. 13, 2017, issued by the European Patent Office in European Application No. 13826037.7.
Communication dated Feb. 23, 2019, issued by Korean Patent Office in Korean Patent.
Communication dated Dec. 26, 2017, issued by the Chinese Patent Office in Chinese application No. 201380048995.2.
International Search Report dated Nov. 26, 2013 issued in International Application No. PCT/KR2013/006951 (PCT/ISA/210).
Communication dated Dec. 14, 2015 issued by the European Patent Office in European Patent Application No. 13826037.7.
Communication dated Oct. 25, 2022 by the Indian Patent Office in Indian Patent Application No. 1575/DELNP/2015.
Communication dated Nov. 16, 2022 by the China National Intellectual Property Administration in Chinese Patent Application No. 201910202515.2.
Office Action dated Aug. 10, 2023, issued by the China National Intellectual Property Administration in Chinese Patent Application No. 201910202515.2.

* cited by examiner

FIG. 23A
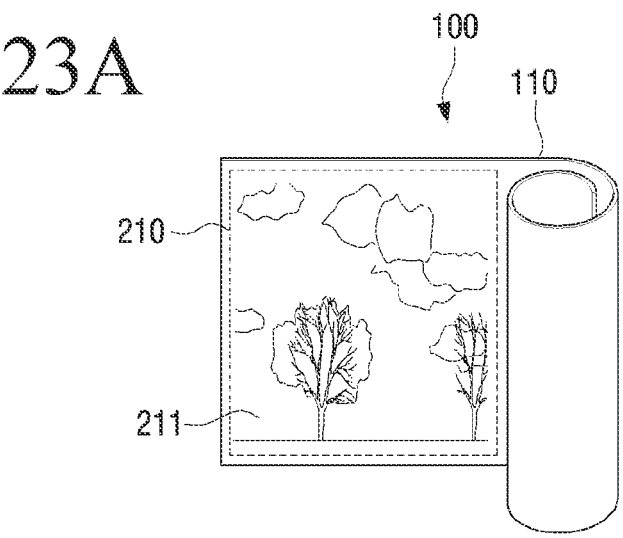
FIG. 23B
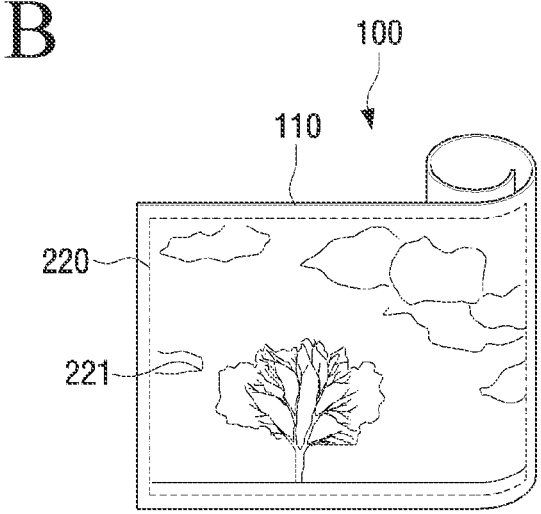
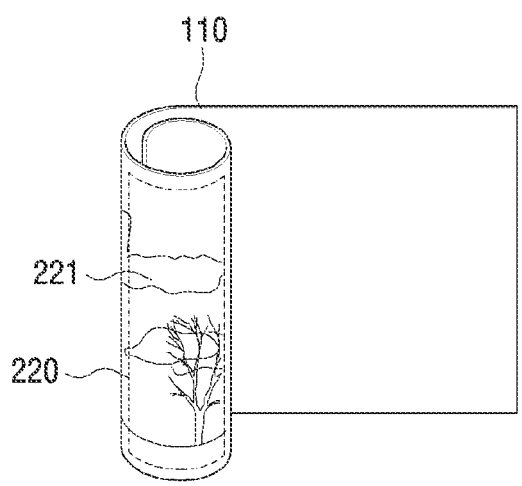

FLEXIBLE DISPLAY DEVICE AND METHOD OF CONTROLLING SAME

CROSS-REFERENCE TO RELATED APPLICATIONS

This application is a Continuation Application of U.S. application Ser. No. 17/066,795, filed Oct. 9, 2020, which is a Continuation Application of U.S. application Ser. No. 16/298,104, filed on Mar. 11, 2019 and was issued as U.S. Pat. No. 10,802,544 on Oct. 13, 2020, which is a Continuation Application of U.S. application Ser. No. 14/419,130, filed on Feb. 2, 2015, was issued U.S. Pat. No. 10,241,542 on Mar. 26, 2019, which is a National Phase Application of International Patent Application No. PCT/KR2013/006951, filed Aug. 1, 2013, claiming priority from Korean Patent Application No. 10-2012-0084512, filed Aug. 1, 2012. The disclosures of the prior applications are hereby incorporated in their entireties by reference.

BACKGROUND

1. Field

The present general inventive concept relates to a flexible display device and a method of controlling the same, and more particularly, to a flexible display device including a flexible display unit and a method of controlling the same.

2. Description of the Related Art

Recent developments in electronic technologies have brought about the development of various types of display devices. In particular, display devices, such as a TV, a PC, a laptop computer, a tablet PC, a portable phone, an MP3 player, etc., have been widely distributed to be used in most households.

In order to meet the needs of users who want newer and more of a variety of functions, efforts to develop newer forms of display devices have been made. These types of display devices are named next generation displays.

A flexible display device is an example of next generation display devices. The flexible display device refers to a display device having a deformable characteristic like paper.

Since a user applies a force to the flexible display device to bend the flexible display device and change a shape thereof, the flexible display device may be variously used. For example, the flexible display device may be realized as a portable device such as a portable phone, a tablet PC, an electronic frame, a personal digital assistant (PDA), an MP3 player, etc.

The flexible display device has a flexible characteristic unlike existing display devices. Therefore, there is a need for methods of displaying a screen appropriate for a flexible display device having a changed shape.

SUMMARY

The exemplary embodiments provide a flexible display device for performing various functions when rolling and/or bending the flexible display device, and a method of controlling the same.

According to an aspect of the exemplary embodiments, there is provided a flexible display device including: a display; a sensor configured to detect at least one rolling characteristic in response to the display unit being rolled; and a controller configured to perform a first function of the flexible display device based on the detected at least one rolling characteristic.

The display unit may be rolled based on one axis.

The rolling characteristic may include at least one from among a rolling diameter and a rolling area of the display unit.

In response to the display being rolled and the rolling diameter being changed, the controller may perform a second function corresponding to the changed rolling diameter.

Upon a condition that the display includes a plurality of rolling areas, the sensor may detect rolling diameters respectively corresponding to the plurality of rolling areas. Upon a condition that the display unit is rolled and at least one from among the rolling diameters respectively corresponding to the plurality of rolling areas is changed, the controller may perform a third function corresponding to the changed at least one from among the rolling diameters.

The controller is configured to perform a second function in response to rolling an entire area of the display and a third function in response to partial partially rolling a partial area of the display.

The second function may be a screen mode change function, and the third function may be a sub-function of content already being displayed on the display unit.

In response to at least a partial area of the display being exposed based on a manipulation of unrolling the display unit, the controller may reconstitute an image according to a size of the exposed partial area to display the reconstituted image in the exposed partial area.

According to an aspect of the exemplary embodiments, there is provided a method of controlling a flexible display device, the method including: detecting at least one rolling characteristic in response to a display of the flexible display device being rolled; and performing a first function of the flexible display device based on the detected at least one rolling characteristic.

The display may be rolled based on one axis.

The rolling characteristic may include at least one from among a rolling diameter and a rolling area of the display.

The method may further include: upon a condition that the display unit is rolled and the rolling diameter is changed, performing a second function corresponding to the changed rolling diameter.

The method may further include: upon a condition that the display comprises a plurality of rolling areas, detecting rolling diameters respectively corresponding to the plurality of rolling areas; and upon a condition that the display is rolled and at least one from among the rolling diameters respectively corresponding to at least one from among the plurality of rolling areas is changed, performing a second function corresponding to the changed at least one from among the plurality of rolling diameters.

The method may further include: performing a second function in response to rolling an entire area of the display and performing a third function in response to partially rolling a partial area of the display.

The second function may be a screen mode change function, and the third function may be sub-function of a content already being displayed on the display.

The method may further include: in response to at least a partial area of the display being exposed according to a manipulation of unrolling the display unit, reconstituting an image according to a size of the exposed partial area to display the reconstituted image in the exposed partial area.

The flexible display device may further comprise a main body, wherein the display is operable to be pulled out of the main body.

The display of the flexible display device may comprise at least one from among bend sensors, strain gauges, and acceleration sensors to determine a degree of rolling in which the display has been rolled.

If the display is partially rolled, a portion of the display that is not rolled comprises a display surface of an image or moving image.

According to an exemplary embodiment, there is provided a flexible display device comprising: a display; a sensor configured to detect one of a twisting characteristic, a bending characteristic, and a folding characteristic when the display is one of twisted, bent, and folded; and a controller configured to perform a first function of the flexible display device based on the detected one of the twisting characteristic, the bending characteristic, and the folding characteristic.

If the display is partially twisted, partially bent, or partially folded, a portion of the display that is not twisted, bent, or folded comprises a display surface of an image or moving image.

According to yet another exemplary embodiment, there is provided a system comprising a flexible display device and a support unit. The flexible display device comprises: a display; a sensor configured to detect at least one rolling characteristic in response to the display being rolled; and a controller configured to perform a first function of the flexible display device based on the detected at least one rolling characteristic, wherein the first function is performed when the display is rolled and inserted into the support unit.

The first function as mentioned above includes displaying an image on a portion of the rolled display that is not covered by the support unit.

According to various exemplary embodiments as described above, a flexible display device may be used in various ways, and thus convenience of users may be improved.

BRIEF DESCRIPTION OF THE DRAWINGS

FIGS. 21A, 21B, 22A, 22B, 22C, 22D, 23A, 23B, 24A, 24B, 24C, 24D, 24E, 25, 26, 27A, 27B, 27C, 28A, 28B, 28C and 29 are views illustrating a method of controlling a flexible display device, according to another exemplary embodiment.

DETAILED DESCRIPTIONS OF THE EXEMPLARY EMBODIMENTS

Hereinafter, the exemplary embodiments will be described in detail with reference to the attached drawings.

Figure 1:
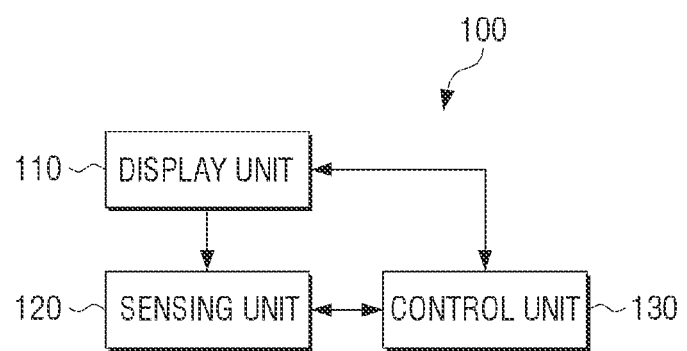
FIG. 1 is a block diagram illustrating a structure of a flexible display device according to an exemplary embodiment.

FIG. 1 is a block diagram illustrating a structure of a flexible display device according to an exemplary embodiment. Referring to FIG. 1, a flexible display device 100 includes a display unit 110, a sensing unit 120, and a control unit 130.

The flexible display device 100 of FIG. 1 may be realized as various types of devices having portability and display functions, like a portable phone, a portable media player (PMP), a PDA, a tablet PC, a navigation system, etc. The flexible display device 100 may be realized as a portable device and a stationary device such as a monitor, a TV, a kiosk PC, or the like.

The display unit 110 displays a screen. Here, the screen may include a play screen or an execution screen for contents such as images, moving pictures, texts, etc., various types of UI screens, etc.

The flexible display device 100 including the display unit 110 has a bendable characteristic. Therefore, the display unit 110 may be formed of a bendable material in a bendable structure. A detailed structure of the display unit 110 will now be described with reference to FIG. 2.

Figure 2:
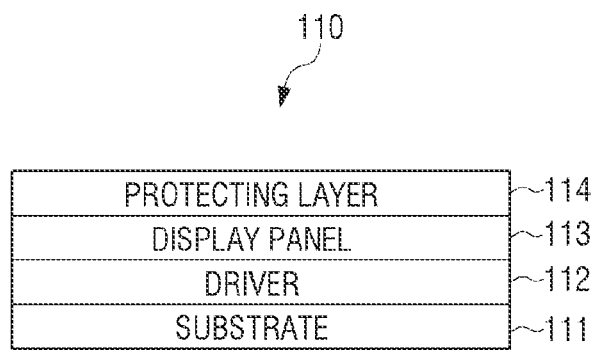
FIG. 2 is a view illustrating a basic structure of a display unit of a flexible display device, according to an exemplary embodiment.

FIG. 2 is a view illustrating a basic structure of a display unit of a flexible display device according to an exemplary embodiment. Referring to FIG. 2, the display unit 110 includes a substrate 111, a driver 112, a display panel 113, and a protecting layer 114.

The flexible display device 100 refers to a device that keeps a display characteristic of an existing flat-panel display device but may be twisted, bent, folded, or rolled. Therefore, the flexible display device 100 may be manufactured on a flexible substrate.

In detail, the substrate 111 may be realized as a plastic substrate (for example, a polymer film) that may be deformed by external pressure.

The plastic substrate has a structure in which barrier coating is performed on both sides of a base film. The base film may be realized as various types of resins such as Polyimide (PI), Polycarbonate (PC), Polyethyleneterephtalate (PET), Polyethersulfone (PES), Polythylenenaphthalate (PEN), Fiber Reinforced Plastic (FRP), etc. Also, the barrier coating may be performed on facing sides of the base film and may be formed of an organic or inorganic layer to keep flexibility.

The substrate 111 may be formed of a material having a flexible characteristic such as thin glass, metal foil, or the like, instead of or in addition to the plastic substrate.

The driver 112 drives the display panel 113. In detail, the driver 112 applies a driving voltage to a plurality of pixels constituting the display panel 113 and may be realized as an a-si TFT, a low temperature poly silicon (LTPS) TFT, an organic TFT, or the like. The driver 112 may be realized as various types of the display panel 113. For example, the display panel 113 may include an organic emitter including a plurality of pixel cells and an electrode layer covering both sides of the organic emitter. In this case, the driver 112 may include a plurality of transistors respectively corresponding to the pixel cells of the display panel 113. The control unit 130 applies an electric signal to gates of the respective transistors so as to enable the pixel cells connected to the transistors to emit light. Therefore, an image may be displayed.

Alternatively, the display panel 113 may be realized as an organic light-emitting diode, an electroluminescent light (EL), an electrophoretic display (EPD), an electrichromic display (ECD), a liquid crystal display (LCD), an active-matrix liquid-crystal display (AMLCD), a plasma display panel (PDP), or the like. However, the LCD may not self-emit light and thus needs additional backlight. The LCD that does not use backlight uses ambient light. Therefore, in order to use the LCD display panel 113 without backlight, an outdoor environment having a large amount of light may be satisfactory as an environment for using the LCD display panel 113 without backlight.

The protecting layer 114 protects the display panel 113. For example, the protecting layer 114 may be formed of a material such as ZrO, CeO2, ThO2, or the like. The protecting layer 114 may be formed of a transparent film to cover a whole surface of the display panel 113.

Differently from what is shown in FIG. 2, the display unit 110 may be realized as electronic paper. The electronic paper refers to a display where a characteristic of normal ink is applied to paper and which uses reflected light and thus is different from a general flat-panel display. The electronic paper may change pictures or characters by using electrophoresis using a twisted ball or capsule.

If the display unit 110 is an element formed of a transparent material, the display unit 110 may be realized as a display device having bendable and transparent characteristics. For example, if the substrate 111 is formed of a polymer material such as plastic having a transparent characteristic, the driver 112 is realized as a transparent transistor, and the display panel 113 includes a transparent organic light-emitting layer and a transparent electrode, the display unit 110 may have transparency.

The transparent transistor refers to a transistor that is manufactured by replacing opaque silicon of an existing thin film transistor with a transparent material such as transparent zinc oxide, titanium oxide, or the like. Also, the transparent electrode may be formed of a new material such as indium tin oxide (ITO) or graphene. The graphene refers to a material where carbon atoms are connected to one another to form a honeycombed planar structure and which has a transparent property. The transparent organic light-emitting layer may also be formed of various kinds of materials.

Figure 3A:
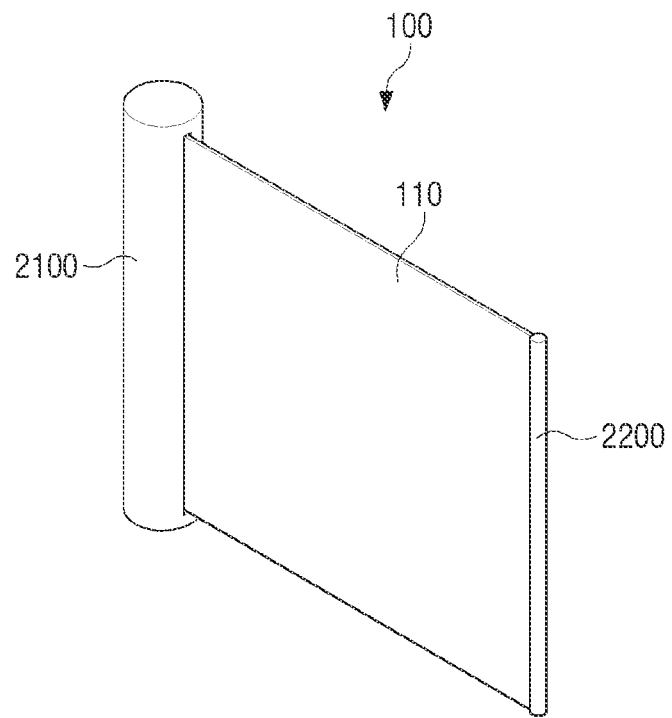
FIGS. 3A and 3B are views illustrating a shape of a flexible display device, according to an exemplary embodiment.
Figure 3B:
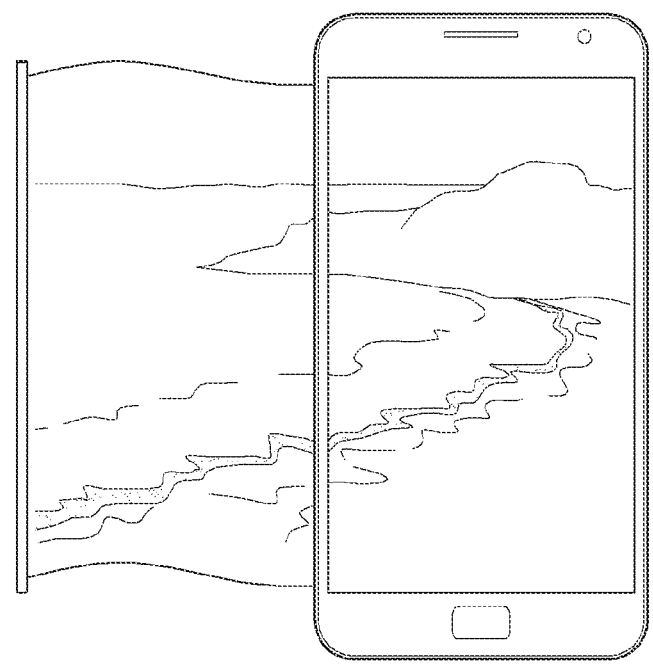

FIGS. 3A and 3B are views illustrating a shape of a flexible display device according to an exemplary embodiment.

Referring to FIG. 3A, the flexible display device 100 includes a main body 2100, a display unit 110, and a gripper 2200.

The flexible display device 100 refers to a device that keeps a display characteristic of an existing flat-panel display device but may be twisted, bent, folded, or rolled like paper. Therefore, the flexible display device 100 including the display unit 110 may have a bendable characteristic, and the display unit 110 may be formed of a bendable material in a bendable structure. This will be described later with reference to FIGS. 5A through 5D.

The main body 2100 operates as a kind of case housing the display unit 110. The main body 2100 includes a rotating roller that rolls the display unit 110. Therefore, when the display unit 110 is not used, the display unit 110 may be rolled on the rotating roller to be housed in the main body 2100.

If a user grips the gripper 2200 to pull the display unit 110, the rotating roller rotates in an opposite direction to the rolling described above, to unroll the display unit 110, and thus the display unit 110 comes out of the main body 2100. The rotating roller may include a stopper (not shown). Therefore, if the user pulls the gripper 2200 to a preset distance or more, rolling of the rotating roller may be stopped by the stopper, and the display unit 110 may be fixed.

If the user presses a button of the main body 2100 to stop the stopper, the stopper stops the display unit 110 from being rotating in or out of the stopper. Subsequently, the rotating roller may rotate in a backward direction, and thus the display unit 110 may be rolled into the main body 2100. The stopper may have a switch shape that stops an operation of a gear for rotating the rotating roller that affects movement of the display unit in and out of the stopper. An existing rolling structure may be applied to structures of the rotating roller and the stopper as it is, and thus their detailed illustrations and descriptions will be omitted.

The main body 2100 includes a power unit (not shown). The power unit may be realized as various types such as a battery connector in which a disposable battery is installed, a secondary battery which may be charged and used a plurality of times by the user, a solar battery which produces electric power by using solar heat, etc. If the power unit is realized as the secondary battery, the user may connect the main body 2100 to an external power source to charge the power unit (not shown).

The main body 2100 having a cylindrical structure is illustrated in FIGS. 3A and 3B but may be realized in a rectangular shape, a polygonal shape, or the like.

Figure 4:
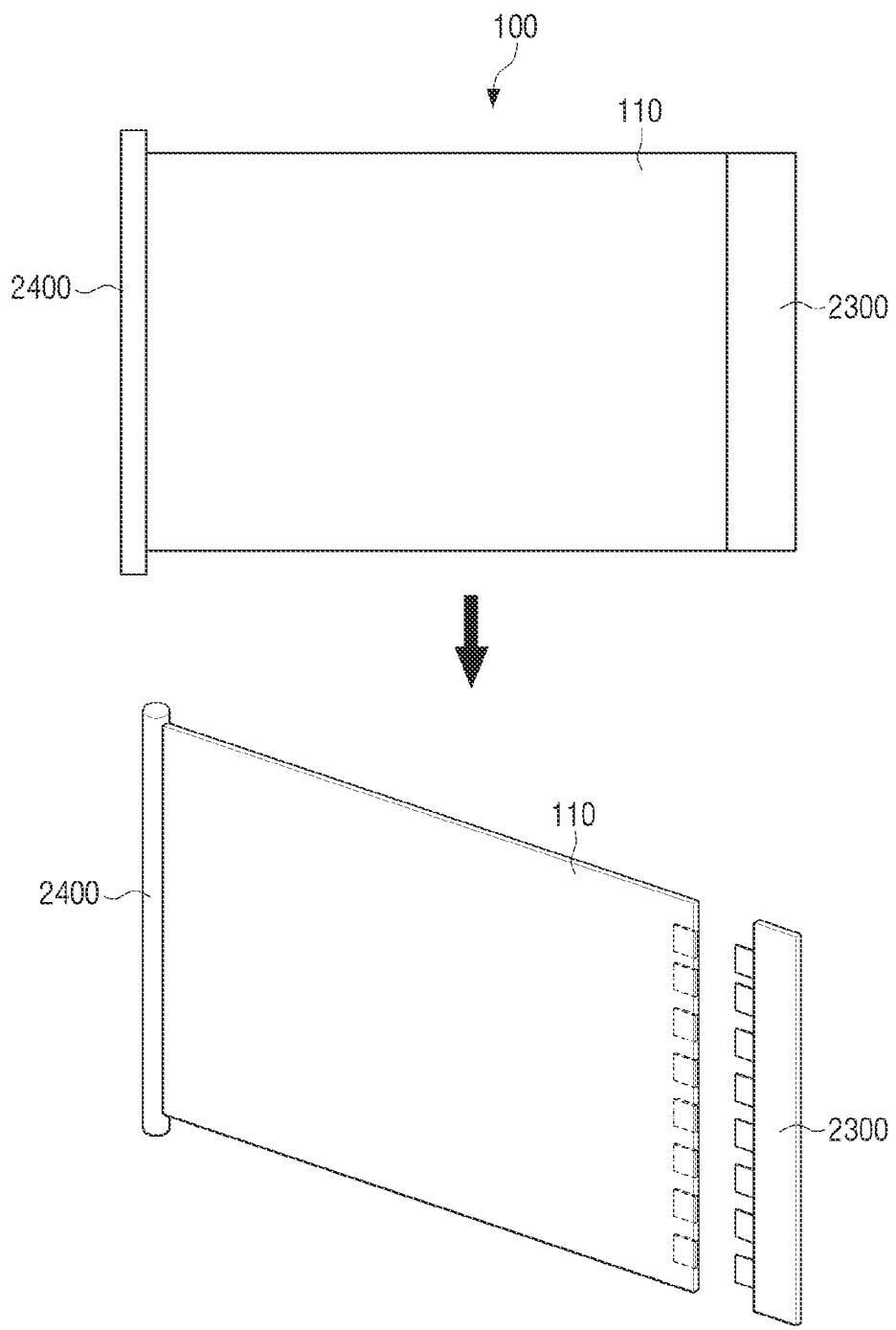
FIG. 4 is a view illustrating a shape of a flexible display device, according to another exemplary embodiment.

FIG. 4 is a view illustrating a shape of a flexible display device according to another exemplary embodiment. Referring to FIG. 4, a power unit 2300 is installed at an edge of a side of the flexible display device 100 to be attached to and detached from the flexible display device 100.

The power unit 2300 may be formed of a flexible material to be bent together with the display unit 110. In detail, the power unit 2300 may include a cathode current collector, a cathode, an electrolyte part, an anode, an anode current collector, and a coating covering the cathode current collector, the cathode, the electrolyte, the anode, and the anode current collector.

For example, the cathode current collector may be formed of: an alloy material such as a TiNi-based material having a high elastic characteristic; a pure metal material such as copper, aluminum, or the like; pure metal coated with carbon; a conductive material such as carbon, carbon fiber, or the like; and/or a conductive polymer such as polypyrrole, or the like.

The cathode may be formed of a cathode material such as a metal material such as lithium, sodium, zinc, cadmium, a hydrogen storage alloy, lead, or the like, a nonmetal material such as carbon or the like, and a polymer electrode material such as organic sulfur.

The anode may be formed of an anode material such as sulfur, metal sulfide, $LiCoO_2$, lithium transition metal oxide, $SOCl_2$, $MnO_2$, $Ag_2O$, $Cl_2$, $NiCl_2$, NiOOH, a polymer electrode, or the like. The electrolyte part may be realized as a gel type using PEO, PVdF, PMMA, PVAC, or the like.

The coating may be formed of a normal polymer resin. For example, PVC, HDPE, epoxy resin, or the like may be used. Any material that may prevent damage to a thread-shaped battery and may be freely twisted or bent may be used as the coating.

The anode and the cathode of the power unit 2300 may respectively include connectors to be electrically connected to the outside.

Referring to FIG. 4, the connectors protrude from the power unit 2300, and grooves corresponding to positions, sizes, and shapes of the connectors are formed in the display unit 110. Therefore, the connectors may be combined with the grooves to combine the power unit 2300 with the display unit 110. The connectors of the power unit 2300 may be connected to a power connecting pad (not shown) of the flexible display device 100 to supply power to the flexible display device 100. A supporting part 2400 is installed at an edge of another side of the flexible display device 100. In detail, the supporting part 2400 may be formed of a flexible material to be bent together with the display unit 110 and may operate as an axis on which the display unit 110 is rolled. The display unit 110 may be rolled by using the power unit 2300 as an axis.

The power unit 2300 is attached to and detached from the edge of the side of the flexible display device 100 in FIG. 4, but this is only an exemplary embodiment. Therefore, a position and a shape of the power unit 2300 may variously vary according to a product characteristic (or a characteristic of the flexible display device 100). For example, if the flexible display device 100 is a product having a preset thickness, the power unit 2300 may be installed on a back side of the flexible display device 100. In this case, additional supporting parts (not shown) may be installed on both sides of the flexible display device 100 to operate as axes on which the display unit 110 is rolled.

FIGS. 5A through 5D are views illustrating a method of rolling a flexible display device according to an exemplary embodiment.

In an exemplary embodiment, the flexible display device 100 includes the display unit 110, and thus rolling of the flexible display device 100 may mean that the display unit 110 is rolled.

Figure 5A:
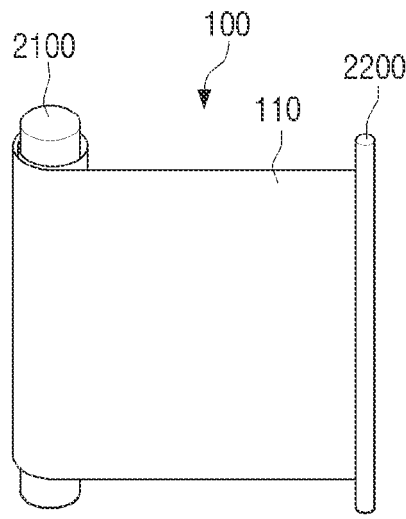
FIGS. 5A, 5B, 5C and 5D are views illustrating a method of rolling a flexible display device, according to an exemplary embodiment.
Figure 5B:
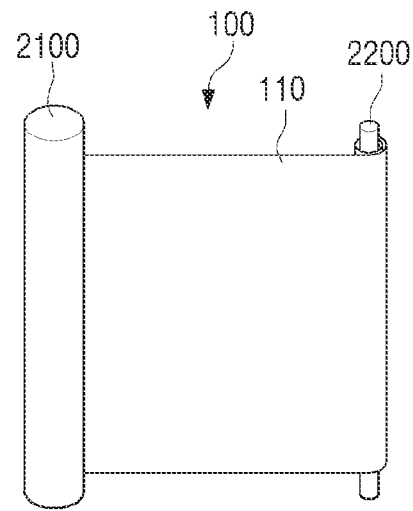

FIGS. 5A and 5B illustrate a method of rolling the display unit 110 in the flexible display device 100 including the main body 2100 having the cylindrical structure. In detail, as shown in FIG. 5A, the display unit 110 that comes out of the main body 2100 may be rolled by using the main body 2100 as an axis. Also, as shown in FIG. 5B, the display unit 110 that comes out of the main body 2100 may be rolled by using the gripper 2200 as an axis.

Figure 5C:
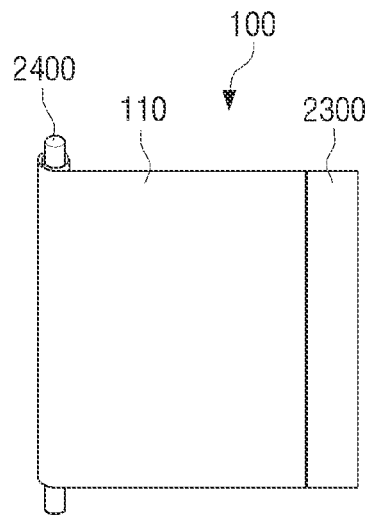
Figure 5D:
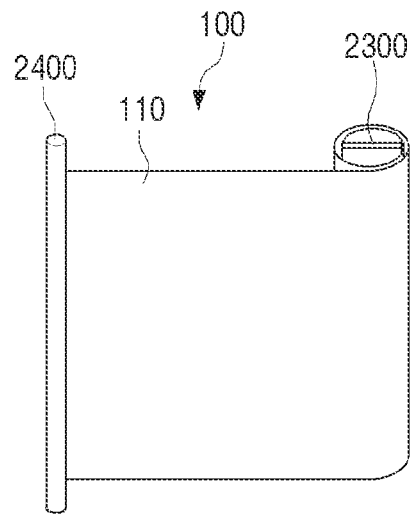

FIGS. 5C and 5D illustrate a method of rolling the display unit 110 in the flexible display device 100 including the power unit 2300 that is installed at an edge area of a side thereof. In detail, as shown in FIG. 5C, the display unit 110 may be rolled by using the supporting part 2400 as an axis. Also, as shown in FIG. 5D, the display unit 110 may be rolled by using the power unit 2300 as an axis.

As described above, the display unit 110 may be rolled according to various methods. However, these are only exemplary embodiments, and thus the display unit 110 may be rolled without an additional axis according to a characteristic of the display unit 110. Therefore, the shapes of the flexible display device 100 shown in FIGS. 3A through 4 are only exemplary embodiments, and thus the flexible display device 100 may be realized in various shapes. A constant force may be continuously applied to the display unit 110 to keep the display unit 110 rolled. Also, the display unit 110 may be kept rolled until an additional force is applied to make the display unit 110 flat.

As described above, the flexible display device 100 may be bent by external pressure so as to change a shape thereof. The shape-changing may include bending and rolling of the flexible display device 100.

"Bending" means that the flexible display device 100 is bent.

"Rolling" means that the flexible display device 100 is rolled. For example, rolling may be defined as bending the display unit 110 at a preset bending angle or more that is sensed in a preset area. Also, the rolling may be defined such that a rolled cross-section of the flexible display device 100 has a shape that is substantially close to a circle or an ellipse.

However, the definitions of the various changed shapes as described above are only exemplary embodiments, and thus the various changed shapes may be differently defined according to a type, a size, a weight, a characteristic, etc. of the flexible display device 100. For example, if the flexible display device 100 is bendable to enable surfaces of the flexible display device 100 to meet each other, the rolling may be defined that front and back surfaces of the flexible display device 100 touch each other due to the bending.

FIGS. 6A through 8D are views illustrating a method of sensing a change in a shape of a flexible display device, i.e., bending and rolling of the flexible display device, according to an exemplary embodiment.

The sensing unit 120 senses a change in a shape of the flexible display device 100. Here, the change in the shape may include bending or rolling of the display unit 110.

In particular, if the display unit 110 is rolled, the sensing unit 120 detects a rolling characteristic. Here, the display unit 110 may be rolled on an axis, and the axis, i.e., a rolling axis, may be a line that connects centers of circles formed by a display surface due to rolling. Also, the rolling characteristic may be at least one selected from a rolling diameter, and a size, a position, and a shape of an exposed area. In this case, the rolling diameter may be an average value of diameters of innermost and outermost surfaces of the display unit 110 that is rolled or the diameter of the outermost surface. If the display unit 110 is partially rolled, the rolling diameter may be a diameter of a partially rolled area of the display unit 110. Also, if a plurality of rolling areas (e.g., areas that have been rolled) exist in the display unit 110, the sensing unit 120 may detect rolling characteristics respectively corresponding to the plurality of rolling areas.

For this, the sensing unit 120 may include bend sensors that are arranged on one surface such as a front or back surface of the display unit 110 or bend sensors that are arranged on the front and back surfaces.

Here, the bend sensors refer to sensors that are bendable and have resistance values varying with a bending degree. The bend sensors may be realized as various types such as optical fiber bending sensors, pressure sensors, strain gauges, etc.

FIGS. 6A through 6D are views illustrating an arrangement shape of bend sensors according to an exemplary embodiment.

Figure 6A:
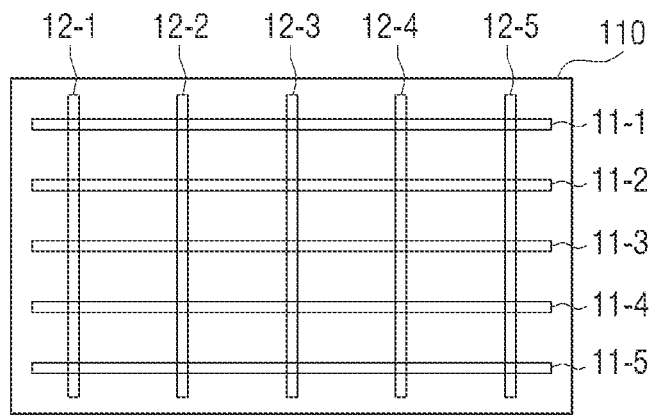
FIGS. 6A, 6B, 6C, 6D, 7A, 7B, 8A, 8B, 8C and 8D are views illustrating changes in a shape of a flexible display device, according to an exemplary embodiment.

FIG. 6A illustrates a plurality of bar-shaped bend sensors that are arranged in horizontal and vertical directions in the display unit 110 to form a lattice shape. In detail, the bend sensors include bend sensors 11-1 through 11-5 that are arranged in a first direction and bend sensors 12-1 through 12-5 that are arranged in a second direction perpendicular to the first direction. The bend sensors may be arranged such that there are preset distances between one another.

Five bend sensors 11-1 through 11-5 and five bend sensors 12-1 through 12-5 are respectively arranged in the horizontal and vertical directions in FIG. 6A, but this is only an exemplary embodiment. The numbers of bend sensors may be changed according to a size of the display unit 110, etc. The bend sensors are arranged in the horizontal and vertical direction as described above to sense bending of all areas of the display unit 110. Therefore, if only parts of a device have flexible characteristics or bending of only parts of the device may be sensed, bend sensors may be arranged at corresponding parts.

The bend sensors may be installed on a front surface of the display unit 110 as shown in FIG. 6A, but this is only an exemplary embodiment. Therefore, the bend sensors may be installed on a back surface of the display unit 110 or on both the front and back surfaces of the display unit 110.

Also, shapes, numbers, and arrangement positions of the bend sensors may be variously changed. For example, one bend sensor or a plurality of bend sensors may be combined with the display unit 110. Here, the one bend sensor may sense one piece of bending data or may have a plurality of sensing channels that sense a plurality of pieces of bending data.

Figure 6B:
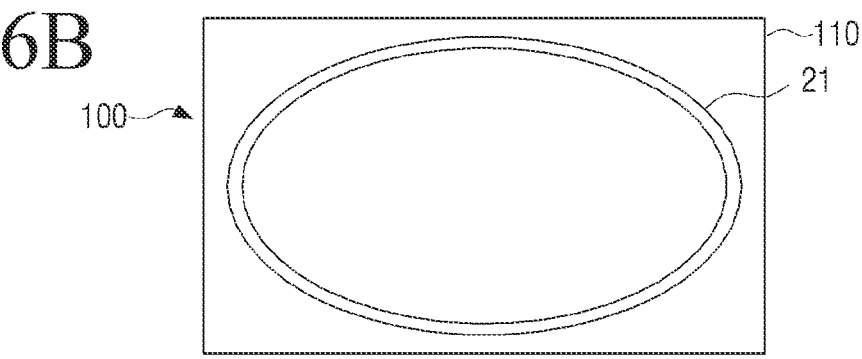

FIG. 6B illustrates one bend sensor that is arranged on a surface of the display unit 110, according to an exemplary embodiment. As shown in FIG. 6B, a bend sensor 21 may be arranged in a circle shape on a front surface of the display unit 110. However, this is only an exemplary embodiment, and thus the bend sensor 21 may be arranged on a back surface of the display unit 110 and may be realized in a closed curve shape forming various polygons such as a rectangular shape, etc.

Figure 6C:
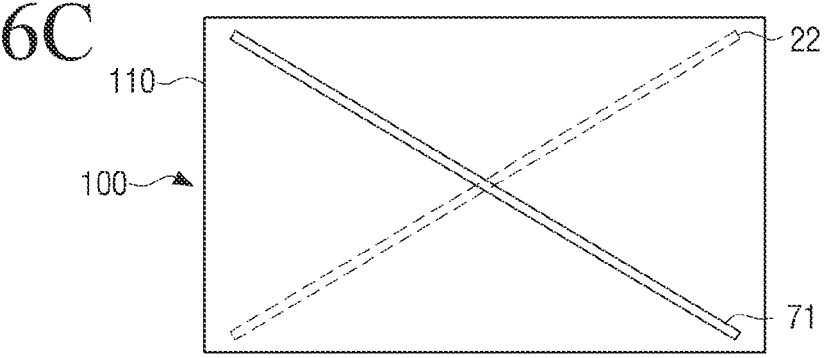

FIG. 6C illustrates two bend sensors that are arranged to cross each other, according to an exemplary embodiment. Referring to FIG. 6C, a first bend sensor 71 is arranged in a first diagonal direction on a first surface of the display unit 110, and a second bend sensor 22 is arranged in a second diagonal direction on a second surface.

According to the above-described various exemplary embodiments, line-shaped bend sensors are used. However, a plurality of strain gauges may be used to sense bending.

Figure 6D:
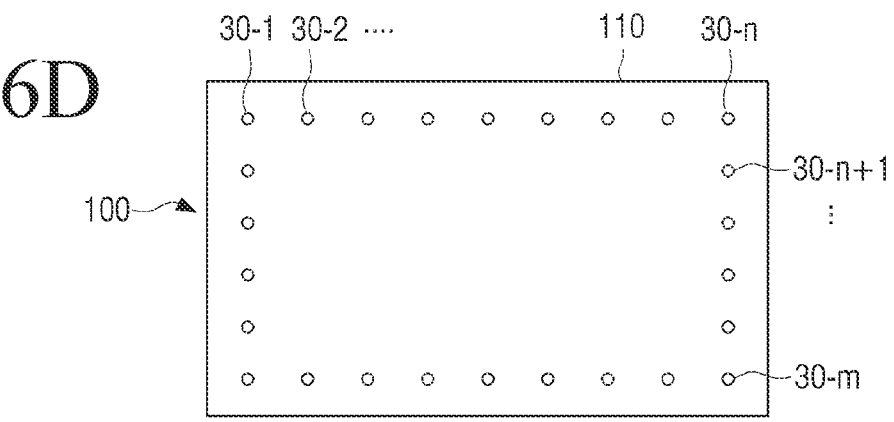

FIG. 6D illustrates a plurality of strain gauges that are arranged on the display unit 110. The strain gauges sense changes in a shape of a surface of an object to be measured, according to changes in a resistance value of metal or semiconductor having resistance greatly varying according to a strength of an applied force. In general, if a length of a material such as metal increases according to an external force, a resistance value of the material increases. If the length of the material decreases, the resistance value decreases. Therefore, if a change in a resistance value is sensed, a change in a shape of the flexible display device 100 may be sensed.

Referring to FIG. 6D, a plurality of strain gauges are arranged in an edge area of the display unit 110. The number of strain gauges may vary according to a size, a shape, preset bending sensing, a resolution, etc. of the display unit 110.

Hereinafter, a method of sensing a change in a shape of the flexible display device 100 by using bend sensors or strain gauges arranged in a lattice shape will be described.

The bend sensors may be realized as electric resistance type sensors using an electric resistance or micro optical fibers using a strain rate of an optical fiber. Hereinafter, for convenience of description, the bend sensors will be described as being realized as electric resistance type sensors.

Figure 7A:
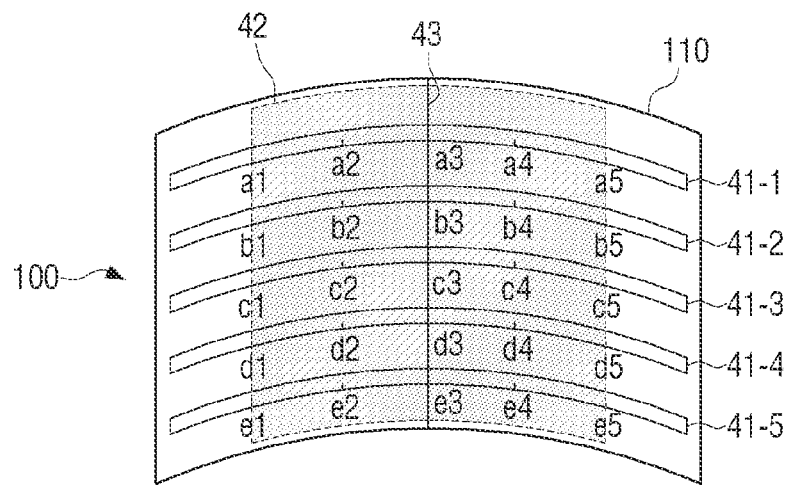
Figure 7B:
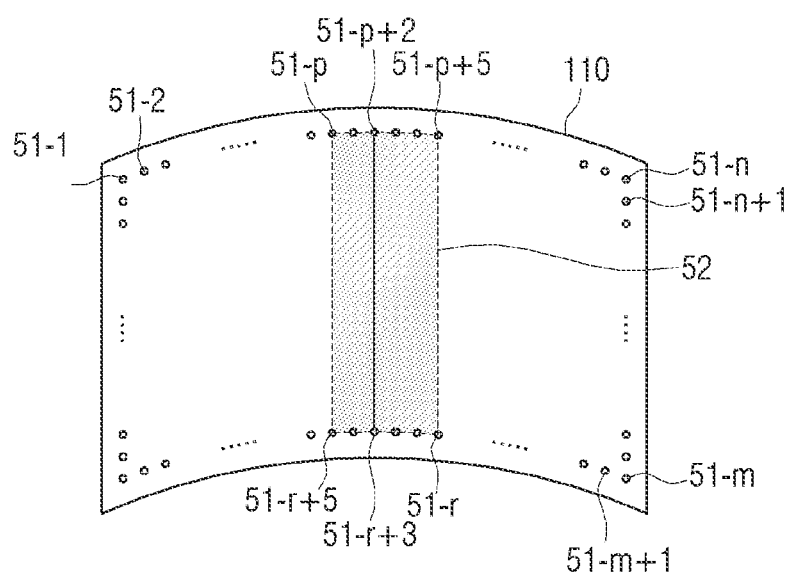

FIGS. 7A and 7B are views illustrating a method of sensing bending in a flexible display device, according to an exemplary embodiment.

If the display unit 110 is bent, bend sensors that are arranged on a surface or both surfaces of the display unit 110 are bent together and output resistance values corresponding to an intensity of an applied tensile force.

In other words, the sensing unit 120 may sense resistance values of the bend sensors by using an intensity of a voltage applied to the bend sensors or an intensity of a current flowing in the bend sensor and may sense bending states in positions of the corresponding bend sensors according to sizes of the resistance values.

For example, as shown in FIG. 7A, if the display unit 110 is bent in a horizontal direction, bend sensors 41-1 through 41-5 that are installed on a front surface of the display unit 110 are also bent and output resistance values according to an intensity of the applied tensile force.

In this case, the intensity of the applied tensile force increases in proportion to a bending degree. For example, if bending is performed as shown in FIG. 7A, a bending degree of a central area is the greatest. Therefore, the greatest tensile force acts on point a3 of the bend sensor 41-1, point b3 of the bend sensor 41-2, point c3 of the bending sensor 41-3, point d3 of the bend sensor 41-4, and point e3 of the bend sensor 41-5 belonging to the central area. Therefore, the points a3, b3, c3, d3, and e3 have the greatest resistance values.

The bending degree becomes weaker toward the outside. Therefore, the bend sensor 41-1 has a resistance value that is smaller to the right and left directions of a3 and point a1 has a resistance value that is smaller than at the point a3. Further, point a1, which is not bent, an area to the left of the point a1, point a5, and an area to the right of the point a5 have resistance values that are the same as before bending is performed. This is equally applied to the other bend sensors 41-2 through 41-5.

The sensing unit 120 may sense positions, sizes, and the number of bending areas, sizes, positions, the number, and directions of the bending lines, the number of times being bent, etc., based on relations between points at which changes in resistance values of the bend sensors are sensed.

The bending areas refer to areas of the display unit 110 that are bent. Since the bend sensors are bent together, the bending areas may be defined as all points at which bend sensors outputting resistance values different than in a circle state are arranged. Areas in which resistance values are not changed may be defined as flat areas that are not bent.

If distances between points at which changes in resistance values are sensed are within preset distances, the sensing unit 120 senses points outputting resistance values as one bending area. If the distances between the points at which the changes in the resistance values are sensed exceed the preset distances, the sensing unit 120 may classify the points as different bending areas.

As described above, in FIG. 7A, points a1 through a5 of the bend sensor 41-1, points b1 through b5 of the bend sensor 41-2, points c1 through c5 of the bend sensor 41-3, points d1 through d5 of the bend sensor 41-4, and points e1 through e5 of the bend sensor 41-5 have resistance values different than in the circle state.

In this case, points of the bend sensors 41-1 through 41-5 at which changes in resistance values are sensed are positioned within preset distances to be sequentially arranged.

Therefore, the sensing unit 120 senses an area 42, including the points a1 through a5 of the bend sensor 41-1, the points b1 through b5 of the bend sensor 41-2, the points c1 through c5 of the bend sensor 41-3, the points d1 through d5 of the bend sensor 41-4, and the points e1 through e5 of the bend sensor 41-5, as one bending area.

The bending area may include a bending line. The bending line may be defined as a line that connects points of each bending area from which the greatest resistance values are detected.

For example, as shown in FIG. 7A, a line 43, which connects the point a3 outputting the greatest resistance value in the bending sensor 41-1, the point b3 outputting the greatest resistance value in the bend sensor 41-2, the point c3 outputting the greatest resistance value in the bend sensor 41-3, the point d3 outputting the greatest resistance value in the bend sensor 41-4, and the point e3 outputting the greatest resistance value in the bend sensor 41-5, may be defined as a bending line. FIG. 7A illustrates a bending line that is formed in a vertical direction in a central area of a display surface.

FIG. 7A describes that the display unit 110 is bent in a horizontal direction and thus illustrates only bend sensors that are arranged in the horizontal direction among bend sensors arranged in a lattice shape. In other words, bend sensors arranged in the vertical direction may sense that the display unit 110 is bent in the vertical direction, by using the same method as when the display unit 110 is bent in the horizontal direction. Also, if a shape of the display unit 110 is changed in a diagonal direction, a tensile force is applied to all of bend sensors arranged in the horizontal and vertical directions. Therefore, the change in the shape of the display unit 110 in the diagonal direction may be sensed based on output values of the bend sensors arranged in the horizontal and vertical directions.

The sensing unit 120 may sense bending of the display unit 110 by using strain gauges.

In detail, if the display unit 110 is bent, a force acts on strain gauges arranged in an edge area of the display unit 110, and the strain gauges output different resistance values according to an intensity of the applied force. Therefore, the sensing unit 120 may sense bending of the display unit 110 based on output values of the strain gauges.

For example, as shown in FIG. 7B, if the display unit 110 is bent in the horizontal direction, a force is applied to strain gauges $51\text{-}p, \ldots, 51\text{-}p+5, 51\text{-}r, \ldots, 51\text{-}r+5$ arranged in a bending area, among a plurality of strain gauges arranged on the front surface of the display unit 110. Also, the strain gauges $51\text{-}p, \ldots, 51\text{-}p+5, 51\text{-}r, \ldots, 51\text{-}r+5$ output resistance values according to an intensity of the applied force. Therefore, the sensing unit 120 senses an area 52, including all of points at which strain gauges outputting resistance values different than in the circle state are positioned, as one bending area.

If lengths of strain gauges increase according to an applied force, the strain gauges output increased resistance values. If the lengths of the strain gauges decrease, the strain gauges output decreased resistance values. Therefore, the sensing unit 120 may sense a line, which connects strain gauges outputting the largest resistance values, or a line, which connects strain gauges outputting the smallest resistance values, as a bending line in consideration of a bending direction.

Here, when a surface of the display unit 110 is x-y plane on a 2-dimensional surface, the bending direction may be divided into direction Z+ that is a front direction of the display unit 110 and direction Z− that is a back direction of the display unit 110, based on axis Z perpendicular to the x-y plane.

Strain gauges may be arranged on a surface or both surfaces of the display unit 110. If the strain gauges are arranged on both surfaces of the display unit 110, i.e., in the front and back directions, the strain gauges arranged in the front direction may sense concave bending in the front direction, i.e., in the direction Z+, and the strain gauges arranged on the back surface may sense concave bending in the back direction, i.e., in the direction Z−.

If the strain gauges are arranged on one surface of the display unit 110, i.e., on the front or back surface, the strain gauges may be realized as shapes that sense bending of the display unit 110 toward the front surface and bending of the display unit 110 toward the back surface. For example, as shown in FIG. 7B, if strain gauges are arranged on the front surface of the display unit 110, the sensing unit 120 may sense a line, which connects strain gauges outputting the smallest resistance values if the display unit 110 is bent in the direction Z+, as a bending line. Also, although not shown in FIG. 7B, if strain gauges are arranged on the front surface of the display unit 110, and the display unit 110 is bent in the direction Z−, the sensing unit 120 may sense a line, which connects strain gauges outputting the largest resistance values, as a bending line.

FIGS. 8A through 8D are views illustrating a method of sensing rolling in a flexible display device according to an exemplary embodiment.

Figure 8A:
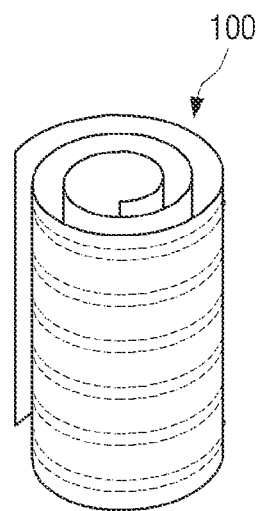
Figure 8B:
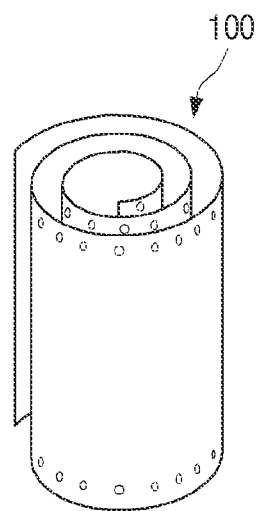

FIGS. 8A and 8B illustrate whole rolling for rolling an entire area of the display unit 110. If the entire display unit 110 is rolled, the whole area of the display unit 110 is bent to a preset curvature or more, and thus forces having approximate intensities are applied to bend sensors and strain gauges within a preset range.

If the entire display unit 110 is rolled, the front and back surfaces of the display unit 110 may touch each other. Therefore, the sensing unit 120 may determine whether the display unit 110 is rolled, according to whether the front and back surfaces of the display unit 110 touch each other. In this case, the sensing unit 120 may include touch sensors.

Therefore, if resistance values output from all points of the bend sensors or the strain gauges approximate one another within a preset range greater than a preset value, and the touch sensors arranged on the front and back surfaces of the display unit 110 sense touches, the flexible display device 100 may determine that the entire display unit 110 is rolled.

Figure 8C:
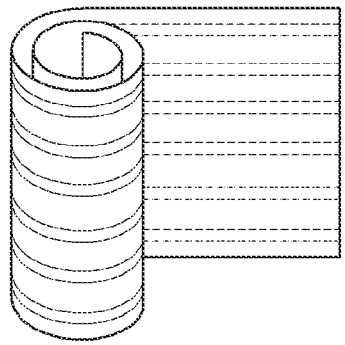
Figure 8D:
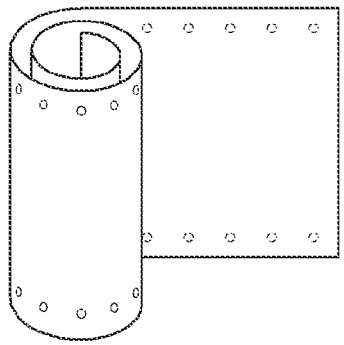

FIGS. 8C and 8D illustrate partial rolling for rolling a partial area of the display unit 110. If the display unit 110 is partially rolled, bend sensors or strain gauges arranged in the rolling area output approximate resistance values within a preset range, as in the case of rolling an entire display unit. Also, the front and back surfaces of the display unit 110 touch each other in the rolled area. An unrolled area is a flat state and thus has the same resistance value as a circle state.

Therefore, if resistance values output from bend sensors or strain gauges arranged in an area of the display unit 110 approximate one another within a preset range greater than a preset value, and touch sensors arranged on the front and back surfaces of the display unit 100 sense touches in the corresponding area, the flexible display device 100 may sense that the display unit 110 is partially rolled.

In the above-described exemplary embodiment, if the display unit 110 is rolled, the front and back surfaces of the display unit 110 have been described as touching each other, but this is only an exemplary embodiment. In other words, although the display unit 110 is rolled according to characteristics (e.g., a material, a shape, a size, a thickness, etc.) of the display unit 110, the front and back surfaces of the display unit 110 may not touch each other.

In this case, the sensing unit 120 may sense whether the front and back surfaces of the display unit 110 touch each other, by using magnetic sensors, magnetic field sensors, photo sensors, proximity sensors, or the like. Also, the flexible display device 100 may determine whether the display unit 110 is rolled, based on the sensing result of the sensing unit 120.

As described above, the flexible display device 100 may be changed into various shapes and may sense the changed shapes based on the sensing result of the sensing unit 120.

The flexible display device 100 may also detect a bending degree, i.e., a bending angle, based on the sensing result of the sensing unit 120.

Although not shown in the drawings, the flexible display device 100 determines a bending degree thereof by using changes in sizes of resistance values output at preset intervals from bend sensors. In detail, a bend sensor calculates a difference between a resistance value of a point outputting the greatest resistance value and a resistance value output from a point having a preset distance from the point outputting the greatest resistance value.

Also, the flexible display device 100 may determine a bending degree by using the calculated difference between the resistance values. In detail, the flexible display device 100 may divide the bending degree into a plurality of levels, and match and store resistance values having preset ranges on each of the levels.

Therefore, the flexible display device 100 may determine a bending degree thereof according to levels belonging to the plurality of levels into which the calculated difference between the resistance values are divided according to the bending degree.

The flexible display device 100 may perform an appropriate operation according to the bending degree. For example, the flexible display device 100 may be realized as an electronic device that selects and outputs a broadcast signal. In this case, if the flexible display device 100 performs a channel zapping operation, the flexible display device 100 may increase a channel zapping speed and a channel zapping range according to the bending degree. If the bending degree is low, the flexible display device 100 may perform the channel zapping according to the smaller number of channels. However, this is only an exemplary embodiment, and even when controlling a volume, changing contents, or the like, the flexible display device 100 may perform different operations according to the bending degree.

As described above, the bending direction of the display unit 110 may be divided into the directions Z+ and Z−. In other words, when the surface of the display unit 110 is the x-y plane on the 2-dimensional surface, the bending direction may be divided into the direction Z+ that is the front direction of the display unit 110 and the direction Z− that is the back direction of the display unit 110, and the flexible display device 100 may determine the bending direction of the display unit 110 through various methods.

FIGS. 9A through 9D are views illustrating a method of sensing a bending direction by using bend sensors that overlap each other, according to an exemplary embodiment. For convenience of description, FIGS. 9A through 9D illustrate bending. However, rolling may also be applied in this embodiment like bending.

Figure 9A:
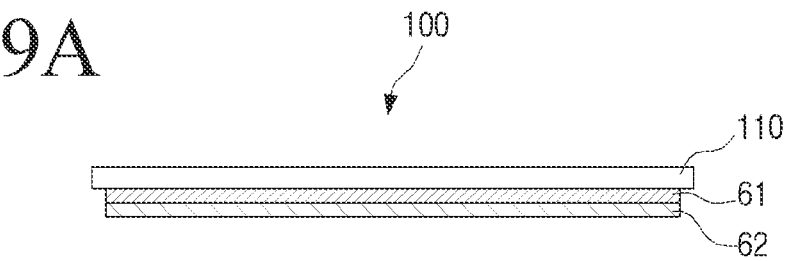
FIGS. 9A, 9B, 9C and 9D are views illustrating a method of sensing a bending direction by using bend sensors that overlap each other, according to an exemplary embodiment.

Referring to FIG. 9A, the sensing unit 120 may include two bend sensors 61 and 62 that overlap each other on a surface of the display unit 110. In this case, if bending is performed in one direction, resistance values of the upper bend sensor 61 and the lower bending sensor 62 are differently detected at a point at which the bending is performed. Therefore, if the resistance values of the two bend sensors 61 and 62 are compared with each other at the same point, a bending direction may be sensed.

Figure 9B:
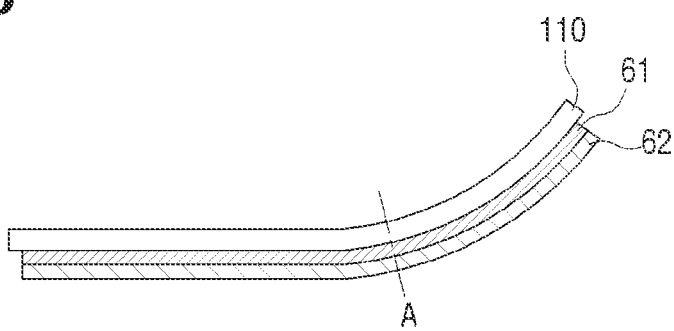

In detail, if the display unit 110 is bent in direction Z+ as shown in FIG. 9B, a greater tensile force is applied to the lower bend sensor 62 than to the upper bend sensor 61 at point A corresponding to a bending line.

Figure 9C:
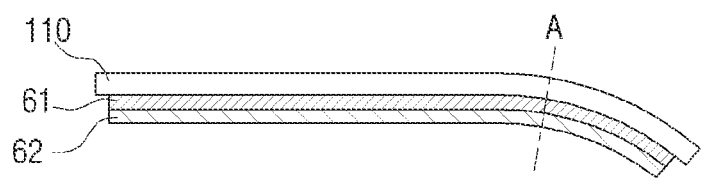

On the contrary to this, if the display unit 110 is bent in direction Z− as shown in FIG. 9C, a greater tensile force is applied to the upper bend sensor 61 than to the lower bend sensor 62.

Therefore, the flexible display device 100 may compare resistance values of the two bend sensors 61 and 62 corresponding to the point A to sense the bending direction.

Two bend sensors overlap each other on the surface of the display unit 110 in FIGS. 9A through 9C, but the sensing unit 120 may include bend sensors that are arranged on both surfaces of the display unit 110.

Figure 9D:
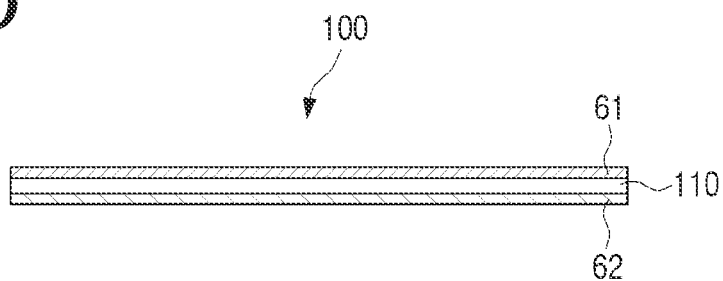

FIG. 9D illustrates the two bend sensors 61 and 62 that are arranged on both surfaces of the display unit 110.

Therefore, when the display unit 110 is bent in the direction Z+, a bend sensor arranged on a first surface of the display unit 110 receives a compressive force, and a bend sensor arranged on a second surface receives a tensile force. When the display unit 110 is bent in the direction Z−, the bend sensor arranged on the second surface receives a compressive force, and the bend sensor arranged on the first surface receives a tensile force. As described above, values detected from two bend sensors may be different from each other according to the bending direction, and the flexible display device 100 may divide the bending direction according to detection characteristics of the values.

The bending direction is sensed by using the two bend sensors as described with reference to FIGS. 9A through 9D but may be divided by using only strain gauges arranged on the surface of the display unit 110. In other words, the strain gauges arranged on the surface receive a compressive force or a tensile force according to their bending direction, and thus characteristics of output values of the strain gauges may be checked to sense the bending direction.

Figure 10A:
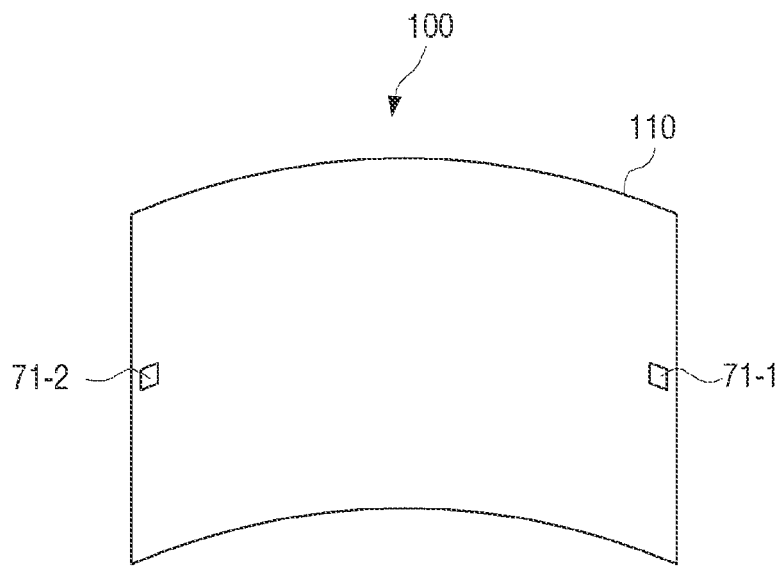
FIGS. 10A and 10B are views illustrating a method of sensing a bending direction, according to another exemplary embodiment.
Figure 10B:
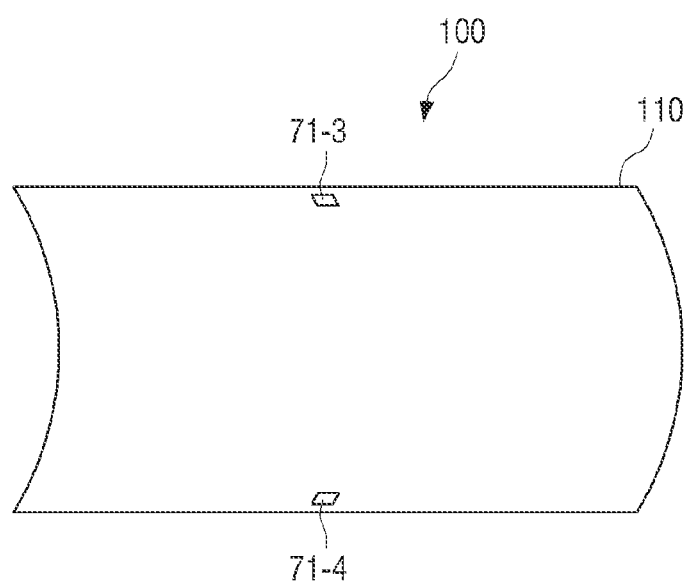

FIGS. 10A and 10B are views illustrating a method of sensing a bending direction according to another exemplary embodiment.

For example, FIGS. 10A and 10B are views illustrating a method of sensing a bending direction by using acceleration sensors. Referring to FIGS. 10A and 10B, the sensing unit 120 includes a plurality of acceleration sensors 71-1 and 71-2 that are arranged in an edge area of the display unit 110.

The acceleration sensors 71-1 and 71-2 are sensors that may measure accelerations and directions of the accelerations when motions occur. In detail, the acceleration sensors 71-1 and 71-2 output sensing values which correspond to gravity acceleration, which varies according to a slope of a device to which the acceleration sensors 71-1 and 71-2 are attached. Therefore, if the acceleration sensors 71-1 and 71-2 are respectively arranged in edge areas of both sides of the display unit 110, output values sensed by the acceleration sensors 71-1 and 71-2 vary when the display unit 110 is bent. The flexible display device 100 calculates a pitch angle and a roll angle by using the output values sensed by the acceleration sensors 71-1 and 71-2. Therefore, a bending direction may be determined based on change degrees of the pitch angle and the roll angle sensed by the acceleration sensors 71-1 and 71-2.

FIG. 10A illustrates the acceleration sensors 71-1 and 71-2 that are arranged at both lateral edges on the front surface of the display unit 110. However, acceleration sensors 71-3 and 71-4 may be arranged in a longitudinal direction as shown in FIG. 10B. In this case, if the display unit 110 is bent in a vertical direction, a bending direction may be sensed according to measurement values sensed by the acceleration sensors 71-3 and 71-4 arranged in the longitudinal direction.

Acceleration sensors are arranged at left and right edges or upper and lower edges of the display unit 110 in FIGS. 10A and 10B but may be arranged at all of the upper, lower, left, and right edges or in corner areas.

The bending direction may be sensed by using gyro sensors or geomagnetic sensors besides acceleration sensors as described above. If a rotary motion occurs, the gyro sensors measure Coriolis' force acting in a speed direction of the rotary motion to detect an angular speed. A rotation direction may be detected according to the measurement values of the gyro sensors, and thus the bending direction may be sensed. The geomagnetic sensors sense azimuth by using biaxial or triaxial flux gates. If the acceleration sensors are realized as the geomagnetic sensors, the geomagnetic sensors arranged at respective edges of the flexible display device 100 perform location movements if the edges are bent, and thus output electric signals corresponding to geomagnetic changes caused by the location movements. The flexible display device 100 may calculate a yaw angle by using values output from the geomagnetic sensors. Therefore, various bending characteristics, such as a bending area, a bending direction, etc., may be determined according to changes in the calculated yaw angle.

As described above, the flexible display device 100 may determine a direction in which a shape change is made, by using various types of sensors. Structures and sensing methods of the above-described sensors may be individually applied to the flexible display device 100 or may be combined with one another to be applied to the flexible display device 100.

The sensing unit 120 may sense a manipulation of a user who touches a screen of the display unit 110. In this case, the sensing unit 120 may include decompressive or capacitive touch sensors to sense coordinates of a point touched by the user.

The control unit 130 controls an overall operation of the flexible display device 100. In particular, the control unit 130 may determine a change in the shape of the flexible display device 100, based on the sensing result of the sensing unit 120. Here, the change in the shape includes bending and rolling. In other words, the control unit 130 may determine whether the display unit 110 is bent, a bending degree of the display unit 110, a bending direction of the display unit 110, whether the display unit 110 is rolled, a rolling degree of the display unit 110, a rolling direction of the display unit 110, etc., by using a value sensed by the sensing unit 120.

In particular, the control unit 130 may perform a first function of the flexible display device 100 that is performable in a rolling mode determined by a rolling characteristic detected by the sensing unit 120. Here, the rolling mode may be determined according to a rolling shape, for example, the rolling mode may include rolling shapes such as a conic shape, a cylindrical shape, whole and/or partial rolling shapes, etc. Also, in case of conic shape, a rolling shape in which a diameter of an upper area is greater and a rolling shape in which a diameter of a lower area is greater may be classified as different rolling modes. In addition, a rolling shape that is changed by a rigid body part (e.g., a rolling shape changed by the main body 2100 of FIG. 5) may also be included in the rolling mode.

Information about functions performable in respective rolling modes may be pre-stored in the flexible display device 100 or may be received from an external source. In other words, information about a function performable in the conic shape, a function performable in the cylindrical shape, a function performable in the whole rolling shape, a function performable in the partial rolling shape, etc. may be pre-stored. For example, in the cylindrical shape, an audio function, a microphone function, a pointing function for controlling an external device, etc. may be stored to be performable according to a size of a rolling diameter.

Also, the functions performable in the respective rolling modes may be determined according to a function that is being performed in the flexible display device 100 right before rolling, a content characteristic displayed on the screen, etc. For example, if the flexible display device 100 is rolled to have a preset rolling diameter or less in an external device control mode, the flexible display device 100 may perform a pointing function.

The rolling characteristic may include at least one selected from a rolling diameter, and a size, a position, and a shape of an area exposed by rolling as described above. Here, the exposed area may be a rolled area or an unrolled area in the case of partial rolling.

If the display unit 110 is rolled, a rolling diameter varies according to a rolling degree, and thus the control unit 130 may determine the rolling degree based on the rolling diameter.

In detail, when the display unit 110 is rolled, the control unit 130 may determine the rolling diameter based on resistance values output from bend sensors or strain gauges. In this case, a table matching rolling diameters according to output resistance values may be pre-stored.

The sensing unit 120 may include magnetic sensors or proximity sensors arranged in an edge area of the display unit 110 to sense a rolling degree of the display unit 110. In this case, when the display unit 110 is rolled, the control unit 130 may determine two different display points at which virtual rolling diameters meet or may determine a proximity degree between areas based on values sensed by the magnetic sensors or the proximity sensors. Also, when the proximity degree is great, the control unit 130 may determine that the rolling degree is great.

When the display unit 110 is rolled, and the rolling diameter is changed by the user, the control unit 130 may perform a function corresponding to the changed rolling diameter.

Also, when the display unit 110 is rolled, and at least one of the rolling diameters corresponding to the plurality of rolling areas is changed, the control unit 130 may perform a function corresponding to the changed rolling diameter. For example, if a rolling diameter is greater than or equal to a preset value, the control unit 130 may perform a music play function. If the rolling diameter is less than the preset value, the control unit 130 may perform a microphone function.

In addition, when the display unit 110 is rolled, the control unit 130 may perform a mapped function corresponding to a manipulation of moving a rolling axis. For example, the manipulation of moving the rolling axis may be mapped onto a touch input, such as an existing tab or an existing scroll, to be used.

If whole rolling, which relates to rolling an entire area of the display unit 110, is sensed, the control unit 130 may perform a function corresponding thereto. If partial rolling, which relates to rolling a partial area of the display unit 110, is sensed, the control unit 130 may perform a function corresponding thereto. For example, if whole rolling is sensed, the control unit 130 may perform a screen mode change function. If partial rolling is sensed, the control unit 130 may perform a sub function of a content that is already displayed.

Also, if at least a partial area of the display unit 110 is exposed because of a manipulation of unrolling the display unit 110, the control unit 130 may reconstitute an image according to a size of the exposed partial area and display the reconstituted image in the exposed partial area. For example, the control unit 130 may adjust a ratio of an image frame according to a size of an exposed area and display the image frame.

As a method of determining a display surface that will provide a screen such as a UI screen or the like in order to perform a function corresponding to a rolling characteristic, through the control unit 130, the following method may be used.

Determining Display Surface for Providing Screen According to Rolling

1) Determining a Display Surface Through a Touch Input

The control unit 130 may determine an area, which receives a touch input of the user, as a display area on a 360-degree direction screen formed by rolling and provide a screen onto a corresponding surface. In this case, the control unit 130 may determine an area, which receives an additional touch input of the user except a part gripped by the user, as a display area.

2) Determining a Display Surface Through a Face Recognition

The control unit 130 may determine a display surface through a face recognition performed by a camera (not shown). For example, the control unit 130 may recognize a face by using the camera (not shown) to determine the display surface. Although a clear face shape is not recognized, the control unit 130 may recognize at least one face characteristic part, such as a face shape, eyebrows, eyes, nose, mouth, hair, or the like, to determine an area watched by the user.

3) Determining a Display Surface by Using an Accelerometer

The control unit 130 may determine a display surface according to a sensing result of the sensing unit 120 that is detected by using a bending line and the accelerometer. However, in this case, the user may control the display surface of the flexible display device 100 in an opposite direction to a gravity acceleration direction, i.e., by looking at the flexible display device 100 from top to bottom.

The control unit 130 may determine a position of the flexible display device 100 by using a sensing result of the accelerometer. For example, the control unit 130 may determine a position of a screen on which the accelerometer is installed, by using a gravity acceleration result sensed by the accelerometer and determine a position of another screen according to a bending shape. The control unit 130 may determine a screen, which is in the opposite direction to the gravity acceleration direction, as the display surface.

4) Determining a Display Surface According to a Gripping Motion of the User

If a two-handed gripping motion is performed, the control unit 130 determines a surface, on which two thumbs are placed in a pressure sensor, a touch sensor, or the like in an area touched by the two thumbs and other fingers, as a display surface.

If a one-handed gripping motion is performed, the control unit 130 determines a surface, on which the thumb is placed in the pressure sensor, the touch sensor, or the like in an area touched by the thumb and the other fingers, as a display surface. In this case, the control unit 130 may determine a display surface according to the number of fingers sensed on one of front and back surfaces on which fingers are placed or a shape of the surface where the fingers are placed.

5) Determining a Display Surface if a Surface is within a Preset Distance Range from a Particular Object If a surface of a 360-degree screen is close to or touches an obstacle due to rolling, the control unit 130 may exclude the corresponding surface from a display surface.

However, when whole rolling (as described above), the control unit 130 may preset a display area in consideration of an area that may be gripped by a hand. Therefore, the control unit 130 may provide the user with a guide to a gripped area.

Although not shown in the drawings, an input unit (not shown) receives a selection of a surface corresponding to a user interface, which is provided through the display unit 110, from the user. For example, if the flexible display device 100 is rolled, the user may select a particular area through the input unit (not shown). The user may also designate an area, which will display the user interface, through the input unit (not shown).

Here, if the display unit 110 is realized as a touch screen type that forms a layer structure with a touch pad, the input unit (not shown) may form a single body with the display unit 110. In this case, the touch screen may be constituted to detect a touch input position, a touch input area, and touch input pressure.

The input unit (not shown) may also receive a user command for controlling an electronic device through the user interface provided through the display unit 110.

A UI processing unit (not shown) processes and/or generates various types of UIs as 2D or 3D forms. Here, as described above, the UIs may be various types of control mode UIs corresponding to changes in the shape of the flexible display device 100. The UI processing unit may also perform jobs such as 2D and/or 3D changes of UI elements, transparency, colors, sizes, shapes, and position adjustments, highlights, animation effects, etc.

A rolling direction refers to a direction in which the display unit 110 is rolled. When the display unit 110 is rolled, the control unit 130 may determine a direction in which the display unit 110 is rolled, based on positions of bend sensors or strain gauges that first output resistance values different than in an original state. For example, if strain gauges that are arranged in a left edge area on the front surface of the display unit 110 first output resistance values different than in the original state, the control unit 130 may determine that the display unit 110 is rolled from the left side. According to this method, the control unit 130 may determine a direction in which the display unit 110 is rolled, i.e., a, left, right, upper, lower, diagonal direction, or the like.

The control unit 130 may also determine the rolling direction by using acceleration sensors (not shown) that are arranged at an edge of the display unit 110. In other words, if the display unit 110 is rolled, the acceleration sensor that is positioned in the rolling direction of the display unit 110 senses a slope. The control unit 130 may determine the rolling direction based on values sensed by the acceleration sensors arranged in left, right, upper, and lower areas of the display unit 110.

If the display unit 110 is rolled, the sensing unit 120 may sense an exposed area of a whole area of the display unit 110 that is exposed when the display unit 110 is rolled. Here, the exposed area may refer to an area in which a screen of the display unit 110 is exposed.

Figure 11:
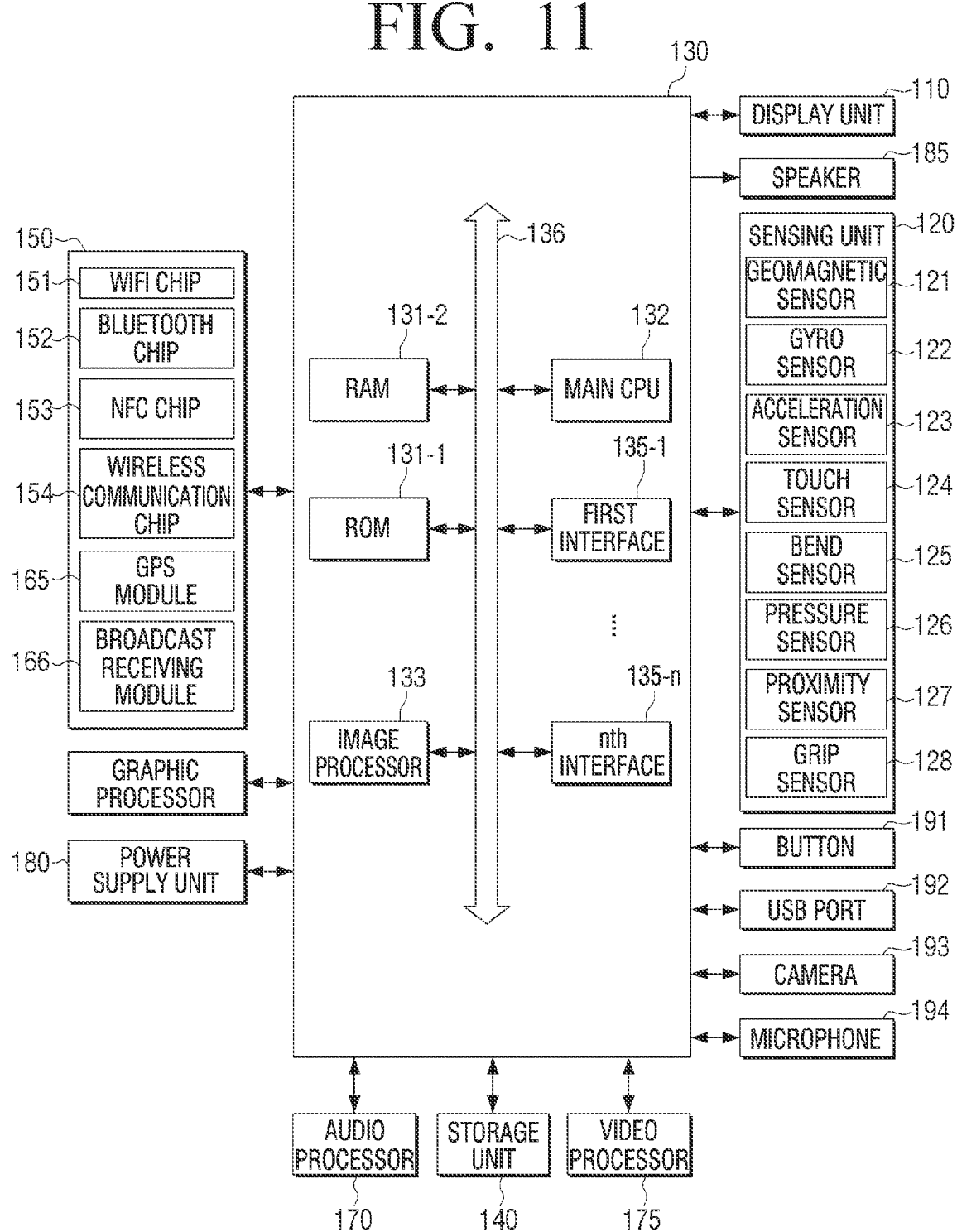
FIG. 11 is a block diagram illustrating a detailed structure of a flexible display device to describe operations according to various exemplary embodiments.

According to an exemplary embodiment, a size of the exposed area exposed by rolling may be determined by a rolling degree. For this, information about the size of the exposed area determined by the rolling degree may be stored in the storage unit 140 (as shown in FIG. 11). Here, the rolling degree may be determined based on sizes of output values output from bend sensors or strain gauges, and a size of an exposed area corresponding to sizes of output resistance values may be calculated and stored. For example, if the display unit 110 is wholly rolled in a horizontal direction, and an output value is determined, information indicating that a display area corresponding to a length of transverse direction A1 is an exposed area, may be pre-stored. Therefore, if the rolling degree is determined based on the sensing result of the sensing unit 120, the control unit 130 may control to read information corresponding to the determined rolling degree from the storage unit 140 in order to process and display an image appropriate for the size of the exposed area.

According to another exemplary embodiment, the sensing unit 120 may include touch sensors that are arranged at preset intervals on the front and back surfaces of the display unit 110, to determine the exposed area exposed by the rolling. Also, if the display unit 110 is rolled, the control unit 130 may determine the size and a position of the exposed area based on the sensing result of the sensing unit 120.

If the display unit 110 is wholly rolled toward an inner surface, i.e., the display unit 110 is wholly rolled to make a display surface concave, a whole area of the display surface is covered, and thus an exposed area does not exist.

However, if the display unit 110 is wholly rolled toward an outer surface, i.e., the display unit 110 is wholly rolled to make the display surface convex, the sensing unit 120 senses touches on the back surface of the display unit 110 by using touch sensors arranged on the front surface of the display unit 110. Here, the control unit 130 may determine an area, in which the touch sensors that are arranged on the front surface of the display unit 110 and the ones on the back surface of the display unit 110 (which are not touched) are arranged, as an exposed area and may determine a size and a position of the exposed area based on a size and a position of the area in which the untouched touch sensors are arranged. Also, if the display unit 110 is partially rolled toward the outer surface, the control unit 130 may determine an exposed area by using the above-described method. In other words, the control unit 130 may determine the area, in which the touch sensors that are arranged on the front surface of the display unit 110 and do not touch the back surface are arranged, as an exposed area.

If the display unit 110 is partially rolled toward the inner surface, the control unit 130 may determine the exposed area based on output values output from bend sensors or strain gauges. If the display unit 110 is partially rolled toward the inner surface, an exposed display surface is not bent. Therefore, the control unit 130 may determine an area, in which bend sensors or strain gauges outputting the same resistance values as in a flat state are distributed, as an exposed area and may determine a size and a position of the exposed area by using a size and a position of the area in which the corresponding sensors are arranged.

If the display unit 110 is rolled, the control unit 130 calculates a cross-section radius in the rolling state based on the sensing result of the sensing unit 120 and determines the exposed area according to the calculated cross-section radius.

The cross-section radius is a radius of a circle formed by the rolling of the display unit 110 and is affected by the rolling degree. In other words, as the rolling degree increases, the cross-section radius becomes small. If the rolling degree is small, the cross-section radius becomes great.

Therefore, the flexible display device 100 may pre-store a cross-section radius value corresponding to the rolling degree, and the control unit 130 may detect a cross-section radius matching with resistance values output from bend sensors or strain gauges when the display unit 110 is rolled, to calculate the cross-section radius in the rolling state.

The control unit 130 may also determine the exposed area by using the calculated cross-section radius. In detail, if the display unit 110 is rolled in the right or left direction, the control unit 130 may calculate a circumference length of the exposed area by using the cross-section radius and perform an arithmetic operation on the calculated circumference length and a vertical length of the display unit 110 to calculate the size of the exposed area. If the display unit 110 is rolled in the upper or lower direction, the control unit 130 may calculate a circumference length of the exposed area by using the cross-section radius and perform an arithmetic operation on the calculated circumference length and a horizontal length of the display unit 110 to calculate the size of the exposed area.

Also, the sensing unit 120 may sense a user grip area that is covered by gripping of the user in the exposed area. In detail, the user grip area may be an area of the display unit which is gripped or covered by a body part of the user, e.g., may be an area touched by a palm.

Therefore, when the flexible display device 100 is rolled, the sensing unit 120 may sense the user grip area through sensors that may sense a user touch, such as a pressure sensor, a touch sensor, etc.

In detail, the sensing unit 120 may include a touch sensor that senses a touch area of the display unit 110. Here, if a touch area having a preset size or more is sensed for a preset time in the rolling state, the control unit 130 may determine the touch area as the user grip area.

The sensing unit 120 may include a pressure sensor for sensing pressure applied to the display unit 110. Here, if pressure having a preset size or more is sensed for a preset time in the rolling state, the control unit 130 may determine an area, from which the pressure is sensed, as the user grip area.

FIG. 11 is a block diagram illustrating a detailed structure of a flexible display device to describe operations according to various exemplary embodiments.

Referring to FIG. 11, the flexible display device 100 includes the display unit 110, the sensing unit 120, the control unit 130, the storage unit 140, a communicator 150, an audio processor 170, a video processor 175, a speaker 185, external input ports 191, 192, 193, and 194, and a power supply unit 180.

The display unit 110 has a flexible characteristic. The structure and the operation of the display unit 110 have been described above in detail, and their repeated descriptions will be omitted.

The storage unit 140 may store various types of programs or data related to the operation of the flexible display device 100, set-up information set by the user, a system operating software, various types of application programs, etc.

The storage unit 140 may also store information about the plurality of functions described above and information about priorities allocated to the plurality of functions.

The storage unit 140 may also store information about at least one function selected from functions respectively matching with respective areas of the display unit 110. Also, the storage unit 140 may store information related to priorities respectively allocated to the functions.

The sensing unit 120 senses user manipulations performed in the display unit 110 and the flexible display device 100, in particular, a bending manipulation, a touch manipulation, etc. Referring to FIG. 11, the sensing unit 120 may include various types of sensors such as a touch sensor 124, a geomagnetic sensor 121, an acceleration sensor 123, a bend sensor 125, a pressure sensor 126, a proximity sensor 127, a grip sensor 128, etc.

The touch sensor 124 may be realized as a capacitive type or a decompressive type. The capacitive type touch sensor refers to a sensor that senses micro electricity of the body of the user when a body part of the user touches the surface of the display unit 110, by using a dielectric coated on the surface of the display unit 110 to calculate touch coordinates. The decompressive type touch sensor refers to a touch sensor that includes two electrode plates installed in a remote control device to sense a current flowing due to a contact between upper and lower plates of a point touched by the user in order to calculate touch coordinates. Besides this, an infrared sensing method, a surface ultrasonic wave propagation method, an integral tension measurement method, a piezo effect method, etc. may be used to sense touch manipulations.

The infrared sensing method refers to a method of sensing a position by using light that is emitted from an infrared light-emitting diode when touching a screen of a monitor including an Opto-Matrix-frame with an object for blocking light such as a finger not to be sensed by an opposite phototransistor.

The surface ultrasonic wave propagation method refers to a method realized by a simple principle using a characteristic propagated along an ultrasonic surface and a characteristic of sound propagated at a regular time and a regular distance, i.e., a method of sensing time intervals of sound that is reflected and received through a transmitter and a reflector.

Also, the integral tension measurement method uses a structure that, if a corner is pressed by a hand, and a tension measurement device positioned at the pressed corner receives the greatest force among tension measurement devices installed at four corners, changes the received force into an electric signal according to a degree of an increasing force and transmits the electric signal to a controller. In this case, the controller may calculate ratios between electric signals of the four corners to detect a touch position.

The piezo effect method refers to a method by which a controller calculates ratios between degrees of pressure of four corners varying according to a degree and a position of touch pressure when a user touches the four corners to calculate coordinate values.

As described above, the touch sensor 124 may be realized as various types.

The geomagnetic sensor 121 is a sensor for sensing a rotation state and a movement direction of the flexible display device 100. The acceleration sensor 123 is a sensor for sensing a slope degree of the flexible display device 100. As described above, the geomagnetic sensor 121 and the acceleration sensor 123 may be respectively used to detect bending characteristics such as a bending direction, a bending area, etc. of the flexible display device 100. However, besides this, the geomagnetic sensor 121 and the acceleration sensor 123 may be used to detect the rotation state, a slope state, or the like of the flexible display device 100.

The bend sensor 125 may be realized as various types and various numbers of bend sensors may be used as described above, to sense a bending state of the flexible display device 100. Various examples of the structure and the operation of the bend sensor 125 have been described above, and thus their repeated descriptions will be omitted.

The pressure sensor 126 senses an amount of pressure applied to the flexible display device 100 when the user performs a touch or bending manipulation and provides the sensed amount of pressure to the control unit 130. The pressure sensor 126 may include a piezo film that is installed in the display unit 110 to output an electric signal corresponding to the amount of pressure. The pressure sensor 126 and the touch sensor 124 are installed separately from each other in FIG. 11. However, if the touch sensor 124 is realized as a decompressive touch sensor, the decompressive touch sensor may also perform a role of the pressure sensor 126.

The proximity sensor 127 is a sensor for sensing an object that does not directly touch the display surface but approaches the display surface. The proximity sensor 127 may be realized as various types of sensors such as a high-frequency oscillation-type proximity sensor that forms a high frequency magnetic field to sense a current induced by a magnetic field characteristic which varies when an object gets near, a magnetic proximity sensor that uses a magnet, a capacitance type proximity sensor that senses varying capacitance due to an approach of an object, a photoelectric type proximity sensor, an ultrasonic type proximity sensor, etc.

The grip sensor 127 is a sensor that is arranged at an edge or a handle part of the flexible display device 100 separately from the pressure sensor 126 to sense a grip of the user. The grip sensor 127 may be realized as a pressure sensor or a touch sensor.

If the control unit 130 analyzes various types of sensing signals sensed by the sensing unit 120 to determine that a bending manipulation has been performed, the control unit 130 may determine active and inactive areas based on a bending line and display a screen corresponding to the active area.

For example, the control unit 130 may perform an operation of processing data acquired through communication with an external device or data stored in the storage unit 140 and outputting the processed data through the active area of the display unit 110, the speaker 185, etc. In this case, the control unit 130 may communicate with the external device by using the communicator 150.

The communicator 150 is an element that communicates with various types of external devices according to various types of communication methods. The communicator 150 may include various types of communication modules such as a broadcast receiving module 166, a near field communication (NFC) module 153, a GPS module 165, a wireless communication module 154, etc. Here, the broadcast receiving module 166 may include a terrestrial broadcast receiving module (not shown) including an antenna, a demodulator, an equalizer, etc. for receiving a terrestrial broadcast signal, a DMB module for receiving and processing a DMB broadcast signal, etc. The NFC module 153 is a module for communicating with an external device positioned in a short range according to a NFC method such as NFC, Bluetooth, Zigbee, or the like. The GPS module 165 is a module for receiving a GPS signal from a GPS satellite to detect a current position of the flexible display device 100. The wireless communication module 154 is a module that is connected to an external network to perform communication according to a wireless communication protocol such as WiFi, IEEE, or the like. The wireless communication module 154 may further include a mobile communication module that is connected to a mobile communication network to perform communication according to various types of mobile communication standards such as $3^{rd}$ Generation (3G), $3^{rd}$ Generation Partnership Project (3GPP), Long Term Evolution (LTE), or the like.

The control unit 130 may control the communicator 150 to receive contents from the external device or transmit contents to the external device according to a function performed in the active area.

The control unit 130 may also recognize a bending manipulation, a touch manipulation, a voice input, or a motion input to perform an operation corresponding to the input. In this case, the control unit 130 may activate the voice recognizer 170 or the video processor 175.

The audio processor 170 collects voices of the user or external sounds by using a voice acquiring means such as a microphone 194 and transmits the collected voices or sounds to the control unit 130. If the audio processor 170 operates in a voice control mode, and a voice of the user corresponds to a preset voice command, the control unit 130 may perform a task corresponding to the voice of the user.

The video processor 175 acquires an image of the user by using an image pickup means (not shown) such as a camera and provides the acquired image of the user to the control unit 130. If the video processor 175 operates in a motion control mode, the control unit 130 analyzes the image of the user to determine that the user makes a motion gesture corresponding to a preset motion command and performs an operation corresponding to the motion gesture.

For example, various types of tasks, such as channel zapping, turning-on a device, turning-off a device, pausing, playing, stopping, rewinding, fast-forwarding, muting, etc., may be controlled by voices or motions but are limited thereto.

Besides this, first, second, . . . , and $n^{th}$ external input ports may be respectively connected to various types of external devices to receive various types of data, programs, control commands, or the like. In detail, a USB port, a headset port, a mouse port, a LAN port, etc. may be included. The power supply unit 180 is an element that supplies power to respective elements of the flexible display device 100. The power supply unit 180 may be realized as a type including an anode current collector, an anode, an electrolyte part, a cathode, a cathode current collector, and a coating enclosing the anode current collector, the anode, the electrolyte part, the cathode, and the cathode current collector. The power supply unit 180 is realized as a rechargeable and dischargeable secondary battery. The power supply unit 180 may be realized as a flexible type to be bent together with the flexible display device 100. In this case, a current collector, an electrode, electrolyte, a coating, etc. may be formed of materials having flexible characteristics. Detailed shape and material of the power supply unit 180 will be separately described later.

Various types of elements that may be included in the flexible display devices 100 are illustrated in FIG. 11. However, the flexible display device 100 may not include all elements and is not limited to an inclusion of only these elements. In other words, some of the elements may be omitted or added according to a product type of the flexible display device 100 or may be replaced with other elements.

The control unit 130 controls the elements according to user manipulations recognized through the sensing unit 120, the audio processor 170, the video processor 175, etc., to perform various types of operations.

Figure 12:
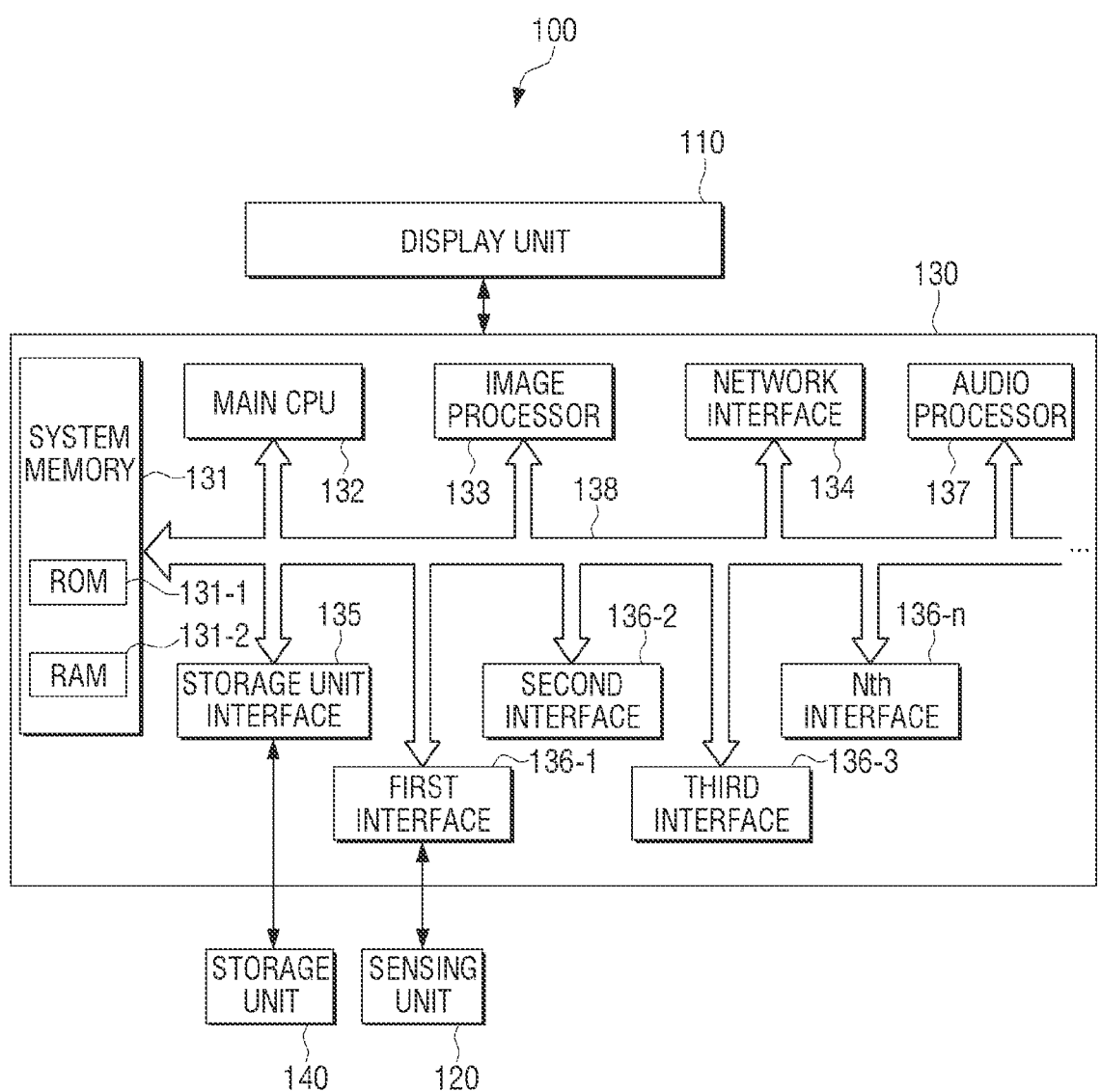
FIG. 12 is a block diagram illustrating a detailed structure of a control unit of FIG. 11.

FIG. 12 is a block diagram illustrating a detailed structure of the control unit 130 of FIG. 11.

Referring to FIG. 12, the control unit 130 includes a system memory 131, a main CPU 132, an image processor 133, a network interface 134, a storage unit interface 135, first through $n^{th}$ interfaces 136-1 through 136-n, an audio processor 137, and a system bus 138.

The system memory 131, the main CPU 132, the image processor 133, the network interface 134, the storage unit interface 135, the first through $n^{th}$ interfaces 136-1 through 136-n, and the audio processor 137 may be connected to one another through the system bus 138 to receive various types of data, signals, or the like.

The first through $n^{th}$ interfaces 136-1 through 136-n support interfaces between various elements including the sensing unit 120 and various types of elements of the control unit 130. In FIG. 12, the sensing unit 120 is connected only to the first interface 136-1. However, as shown in FIG. 11, if the sensing unit 120 includes a plurality of various types of sensors, the plurality of various types of sensors may be respectively connected to interfaces. Also, at least one interface selected from the first through $n^{th}$ interfaces 136-1 through 136-n may be realized as an input interface that receives various types of signals from a button installed in a body part of the flexible display device 100 or from an external device connected through first through $n^{th}$ external input ports audio processor.

The system memory 131 includes a ROM 131-1 and a RAM 131-2. A command set for system booting, etc. are stored in the ROM 131-1. If power is supplied due to an input of a turn-on command, the main CPU 132 copies an O/S stored in the storage unit 140 into the RAM 131-2 and executes the O/S to boot a system according to a command stored in the ROM 131-1. If the booting of the system is completed, the main CPU 132 copies various types of application programs stored in the storage unit 140 into the RAM 131-2 and executes the application programs copied into the RAM 131-2 to perform various types of operations.

As described above, the main CPU 132 may perform various types of operations according to an execution of an application program stored in the storage unit 140.

The storage unit interface 135 is connected to the storage unit 140 to transmit and receive various types of programs, contents, data, etc.

For example, if at least a partial area of the flexible display device 100 is rolled according to a manipulation of the user, the main CPU 132 may access the storage unit 140 through the storage unit interface 135 to check stored information in order to perform a function corresponding to a rolling characteristic, e.g., a moving picture play function. In this state, if the user selects one content, the main CPU 132 executes a moving picture play program stored in the storage unit 140. The main CPU 132 controls the image processor 133 to constitute a moving picture play screen according to a command included in the moving picture play program.

The image processor 133 may include a decoder, a renderer, a scaler, etc. Therefore, the image processor 133 decodes a stored content and renders the decoded content data to constitute a frame, and scales a size of the constituted frame according to a screen size of the display unit 110. The image processor 133 provides the processed frame to the display unit 110 to display the processed frame.

Additionally, the audio processor 137 refers to an element that processes audio data and provides the processed audio data to a sound outputting means such as the speaker 185. The audio processor 137 may perform audio signal processing for decoding audio data stored in the storage unit 140 or audio data received through the communicator 150, filtering noise from the audio data, amplifying the filtered audio data to an appropriate decibel, etc. In the above-described example, if a played content is a moving picture content, the audio processor 137 may process audio data demultiplexed from the moving picture content and synchronize the processed audio data with the image processor 133 to provide the synchronized audio data to the speaker 185.

The network interface 134 is a part that is connected to external devices through a network. For example, if a web browser program is executed, the main CPU 132 accesses a web server through the network interface 134. If webpage data is received from the web server, the main CPU 132 controls the image processor 133 to constitute a webpage screen and displays the constituted webpage screen on the display unit 110.

As described above, if a rolling manipulation is sensed from the flexible display device 100, the control unit 130 may perform an operation corresponding to the sensed rolling manipulation. The above-described operation of the control unit 130 may be realized by executions of various types of programs stored in the storage unit 140.

Figure 13:
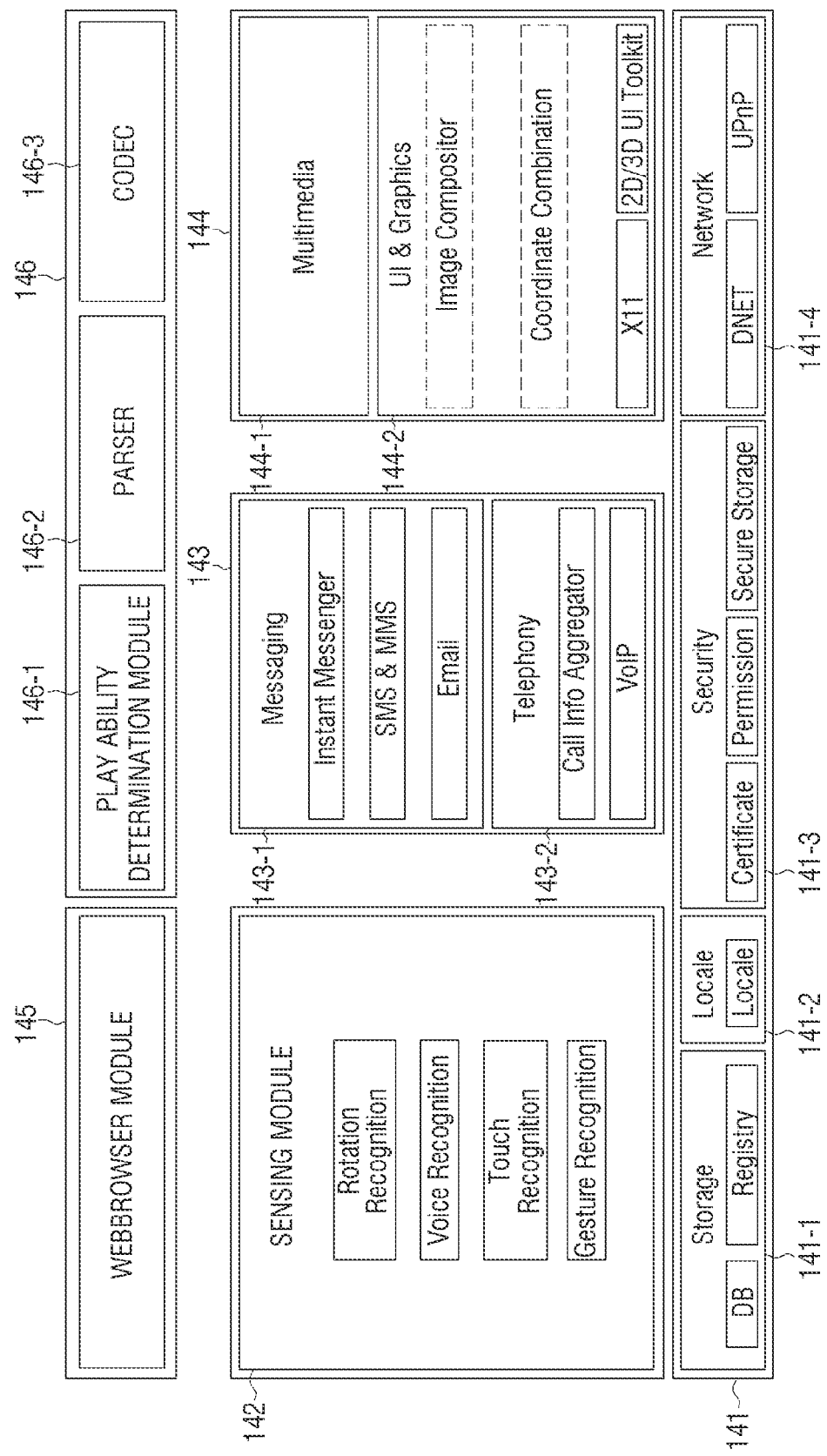
FIG. 13 is a block diagram illustrating a software structure of a storage unit for supporting an operation of the control unit of FIG. 11.

FIG. 13 is a view illustrating a software structure of the storage unit 140 for supporting operations of the control unit 130 according to the above-described various exemplary embodiments. Referring to FIG. 13, the storage unit 140 includes a base module 141, a device management module, a communication module 143, a presentation module 144, a web browser module 145, and a service module.

The base module 141 processes signals transmitted from respective pieces of hardware included in the flexible display device 100 and transmits the processed signals to an upper layer module.

The base module 141 includes a storage module 141-1, a location-based module 141-2, a security module 141-3, a network module 141-4, etc. The storage module 141-1 is a program module that manages a database (DB) or a registry. The location-based module 141-2 is a program module that operates together with hardware such as a GPS chip to support a location-based service. The security module 141-3 is a program module that supports certification, permission, secure storage, etc. of hardware. The network module 141-4 is a module for supporting a network connection and includes a DNET module, an UPnP module, etc.

The device management module is a module for managing and using information about an external input and an external device. The device management module may include a sensing module 142, a device information management module, a remote control module, etc.

The sensing module 142 is a module that analyzes sensor data provided from various types of sensors of the sensing unit 120. In detail, the sensing module 142 is a program module that performs an operation of detecting a position of an object or a position, a color, a shape, a size, and other profiles of the user. The sensing module 142 may include a face recognition module, a voice recognition module, a motion recognition module, an NFC recognition module, etc. The device information management module is a module that provides information about various types of devices. The remote control module is a program module that performs an operation of remotely controlling a peripheral device such as a phone, a TV, a printer, a camera, an air conditioner, or the like.

The communication module 143 is a module for communicating with an external device. The communication module 143 may include a messaging module 143-1 including a Short Message Service (SMS) & a Multimedia Message Service (MMS) program, an e-mail program, etc. and a telephony module 143-2 including a call information aggregator program module, a VoIP module, etc.

The presentation module 144 is a module for constituting a display screen. The presentation module 144 includes a multimedia module 144-1 for playing and outputting multimedia contents and a UI & graphic module 144-2 for performing UI and graphic processing. The multimedia module 144-1 may include a player module, a camcorder module, a sound processing module, etc. Therefore, the multimedia module 144-1 performs an operation of playing various types of multimedia contents to generate and play a screen and a sound. The UI & graphic module 144-2 may include an image compositor module that composes images, a coordinate combination module that combines and generates coordinates on a screen that is to display an image, an X11 module that receives various types of events from hardware, a 2D/3D UI toolkit that provides a tool for constituting a 2D or 3D UI, etc.

The web browser module 145 refers to a module that performs web browsing to access a web server. The web browser module 145 may include various types of modules such as a web view module that constitutes a webpage, a download agent module that performs downloading, a bookmark module, a webkit module, etc.

Additionally, the service module refers to an application module for providing various types of services. For example, the service module may include various types of modules such as a navigation service module that provides information about a map, a current position, a landmark, a path, etc., a game module, an advertisement application module, etc.

The main CPU 132 of the control unit 130 accesses the storage unit 140 through the storage unit interface 135 to copy various types of modules stored in the storage unit 140 into the RAM 131-2 and performs operations according to operations of the copied modules.

In detail, the main CPU 132 analyzes output values of various types of sensors of the sensing unit 120 to determine whether rolling is performed, by using the sensing module 142. If it is determined that the rolling is performed, the main CPU 132 detects information about a function corresponding to a rolling characteristic from the DB of the storage module 141. The main CPU 132 drives a module corresponding to the detected information to perform an operation.

For example, if a Graphic User Interface (GUI) display operation is performed, the main CPU 132 constitutes a GUI by using the image compositor module of the presentation module 144. The main CPU 132 controls the display unit 110 to determine a display position of a GUI screen and display the GUI screen in the display position by using the coordinate combination module.

Alternatively, if a user manipulation corresponding to a message receiving operation is performed, the main CPU 132 executes the messaging module 143-1 to access a message management server and receive a message stored in a user account. The main CPU 132 also constitutes a screen corresponding to the received message and displays the screen on the display unit 110 by using the presentation module 144.

Besides this, if a phone call operation is performed, the main CPU 132 may drive the telephony module 143-2.

As described above, various types of programs may be stored in the storage unit 140, and the control unit 130 may perform operations according to the above-described various exemplary embodiments by using the various types of programs stored in the storage unit 140.

Figure 14A:
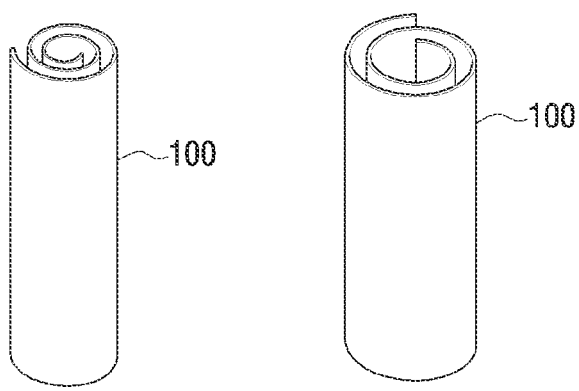
FIGS. 14A and 14B are views illustrating a rolling characteristic according to an exemplary embodiment.
Figure 14B:
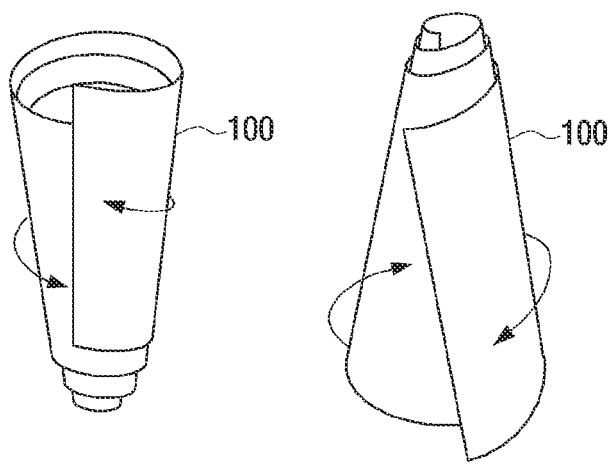

FIGS. 14A and 14B are views illustrating rolling characteristics according to an exemplary embodiment.

FIG. 14A is a view illustrating rolling states according to different rolling diameters.

As shown on left and right sides of FIG. 14A, rolling diameters of the display device 100 may have different values according to the rolled shapes of the display device 100.

A picture shown on the left side of FIG. 14A illustrates a rolling diameter that is smaller than a preset threshold value, and a picture shown on the right side illustrates a rolling diameter that is greater than the preset threshold value. The flexible display device 100 may perform different functions according to the rolling diameter.

Also, as shown in FIG. 14A, if the rolling diameter is changed when the flexible display device 100 is rolled, the flexible display device 100 may perform a function matching with the changed rolling diameter. Here, the rolling diameter matching with different functions may be divided into a plurality of steps. For example, if the rolling diameter is smaller than a first threshold value, the flexible display device 100 may perform a first function. If the rolling diameter is between the first threshold value and a second threshold value, the flexible display device 100 performs a second function. If the rolling diameter is greater than the second threshold value, the flexible display device 100 may perform a third function. Alternatively, a degree of a level performed in the same function may vary according to the rolling diameter. For example, a volume adjustment may be performed according to the rolling diameter.

As shown on left and right sides of FIG. 14B, a rolling diameter of the display device 100 may be changed according to a rolled shape of the display device 100.

A picture shown on the left side of FIG. 14B indicates that the flexible display device 100 is rolled such that the rolling diameter is increased along a cross-sectional axis running from a lower area of the flexible display device 100 toward an upper area of the flexible display device 100. A picture shown on the right side indicates that the flexible display device 100 is rolled such that the rolling diameter decreases' along a cross-sectional axis running from the lower area of the flexible display device 100 toward the upper area. As described above, the flexible display device 100 may perform different functions according to shapes in which the rolling diameter is changed. Alternatively, different functions may be performed according to a position of a rolling axis or a degree of a level performed in the same function may vary according to the position of the rolling axis.

Figure 15A:
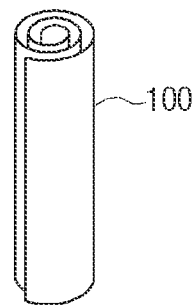
FIGS. 15A, 15B and 15C are views illustrating a rolling characteristic, according to another exemplary embodiment.
Figure 15B:
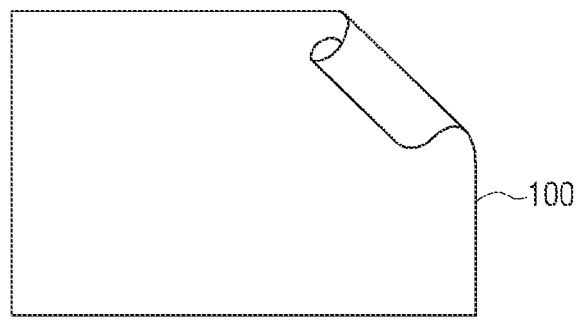
Figure 15C:
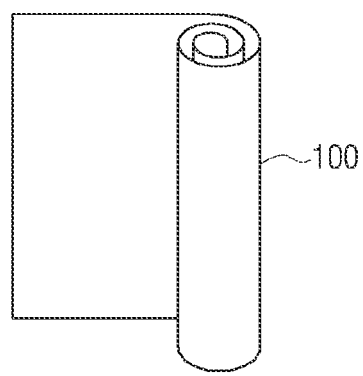

FIGS. 15A through 15C are views illustrating rolling characteristics according to different exemplary embodiments of the present general inventive concept.

As shown in FIG. 15A, rolling of an entire area of the flexible display device 100 may be defined as a whole rolling state.

Also, as shown in FIGS. 15B and 15C, rolling of a partial area of the flexible display device 100 may be defined as a partial rolling state.

The partial rolling state may include corner rolling as shown in FIG. 15B and side rolling as shown in FIG. 15C. The corner rolling may include rolling of a right upper corner area, rolling of a left upper corner area, and rolling of the left lower corner area and a right lower corner area, and the side rolling may include rolling of upper, lower, left, and right areas.

Figure 16A:
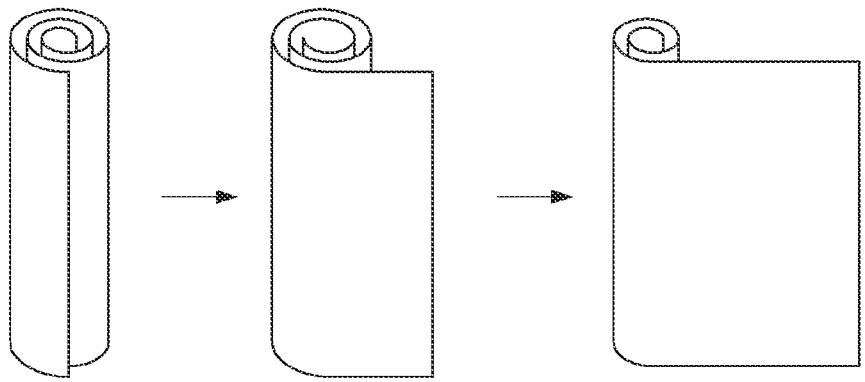
FIGS. 16A, 16B and 16C are views illustrating a method of controlling a flexible display device, according to an exemplary embodiment.
Figure 16B:
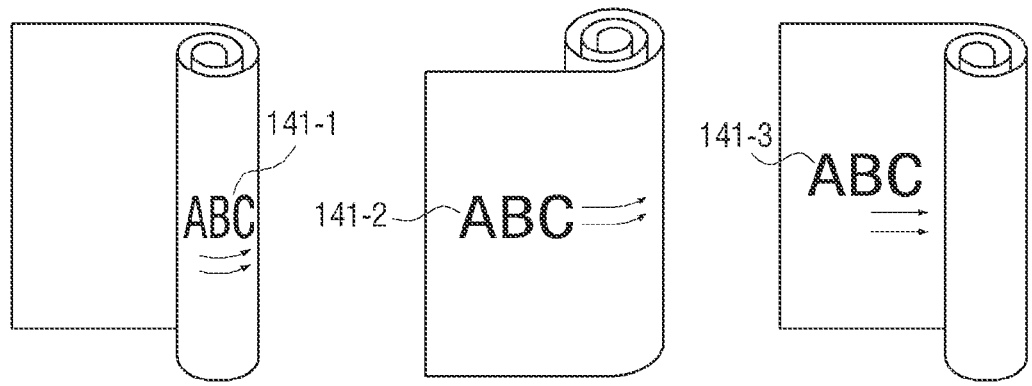
Figure 16C:
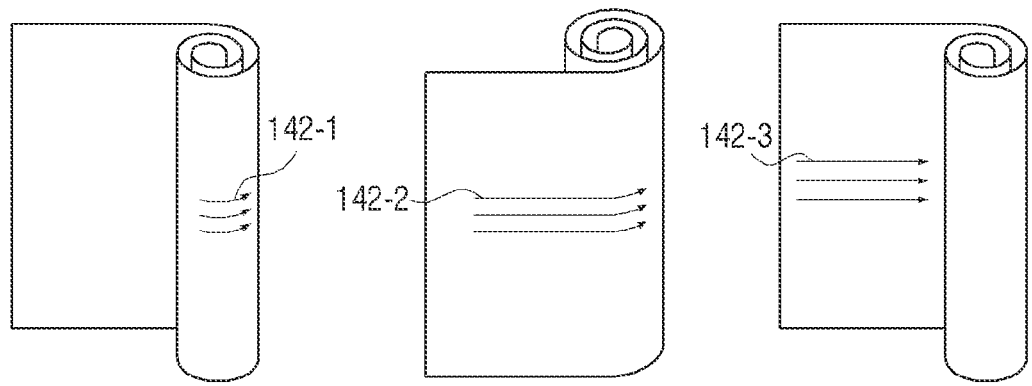

FIGS. 16A through 16C are views illustrating a method of controlling a flexible display device according to an exemplary embodiment.

As shown in FIG. 16A, when the flexible display device 100 is rolled, a manipulation of unrolling a rolled end part may be performed.

In this case, as shown in FIG. 16B, a motion of an unrolling operation may be applied to display a change in a newly displayed content or GUI. For example, as shown in FIG. 16B, rolling directions and display directions 141-1 through 141-3 of a text may be displayed to correspond to each other.

Also, as shown in FIG. 16C, rolling directions may correspond to directions 142-1 through 142-3 of a GUI animation to provide a natural feedback effect. For example, as shown in FIG. 16C, if the GUI animation is an animation inducing an operation of unrolling a rolled part, the animation may be connected to an operation of naturally unrolling the rolled part in an animation direction to provide user experience (UX).

Figure 17A:
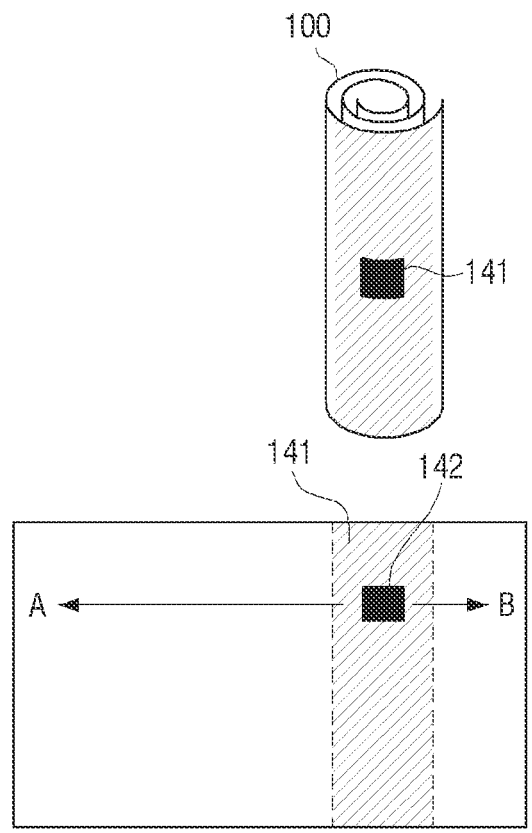
FIGS. 17A and 17B are views illustrating a method of controlling a flexible display device, according to another exemplary embodiment.
Figure 17B:
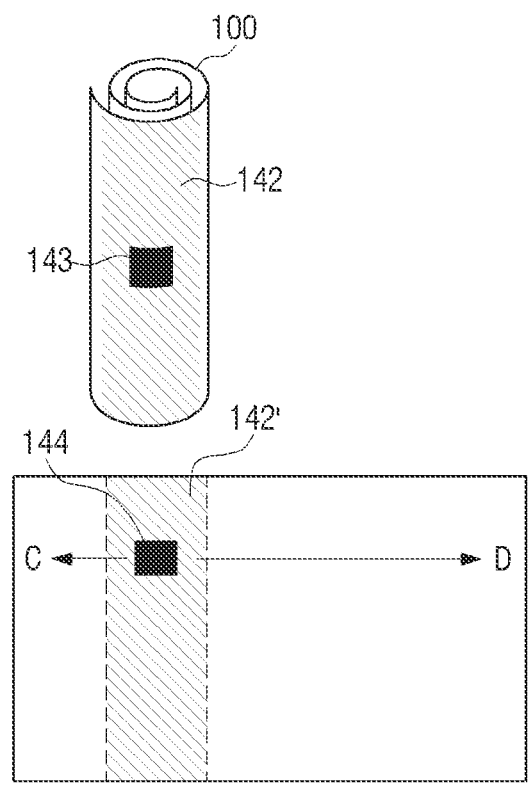

FIGS. 17A and 17B are views illustrating a method of controlling a flexible display device according to another exemplary embodiment.

As shown in FIGS. 17A and 17B, when the flexible display device 100 is rolled, the rolling of the flexible display device 100 may affect a user interaction according to whether the user watches a screen in which direction. For example, if a GUI element is moved by feedback according to whether a rolled area seen by the user is closer to one of the ends of a screen, a movement direction may be determined.

For example, if a manipulation related to maintaining interaction between a user and a GUI is performed, the corresponding GUI may provide an animation that moves toward the rolled area. If a manipulation of deleting a GUI with which a user was interacting, is performed, the corresponding GUI may show an animation that moves toward the unrolled end.

In this case, if the rolled area is unrolled, an area seen to the user may be changed according to a rolled direction and a GUI movement direction may be changed.

As shown in FIG. 17A, if a user manipulation related to keeping a GUI 142 displayed in a first area 141 is performed when the user interacts with the first area 141, and a user manipulation of moving the GUI 142 in direction A and deleting the GUI 142, the GUI 142 may be moved in direction B. For example, if a user manipulation related to deleting an application icon displayed in the first area is performed, the corresponding application icon may be moved in the direction B so that the icon disappears. Also, if a user manipulation related to selecting an application icon displayed in the first area is performed, the corresponding application icon may be moved in the direction A so that the icon disappears, and an application execution screen may be displayed according to a selection.

As shown in FIG. 17B, if a user manipulation of deleting a GUI 144 displayed in a second area 142' is performed when the user interacts with the second area 142', the GUI 144 may be moved in direction C. If a user manipulation related to keeping the GUI 144 is performed, the GUI 144 may be moved in direction D.

FIGS. 18A through 20B are views illustrating a method of controlling a flexible display device according to another exemplary embodiment.

As shown in FIGS. 18A through 20B, if the flexible display device 100 is rolled to have a rolling diameter greater than or equal to a preset threshold value, the flexible display device 100 may perform a first function. If the rolling diameter is reduced when performing the first function, the flexible display device 100 may perform a sub function provided within the first function or may perform a second function different from the first function.

Figure 18A:
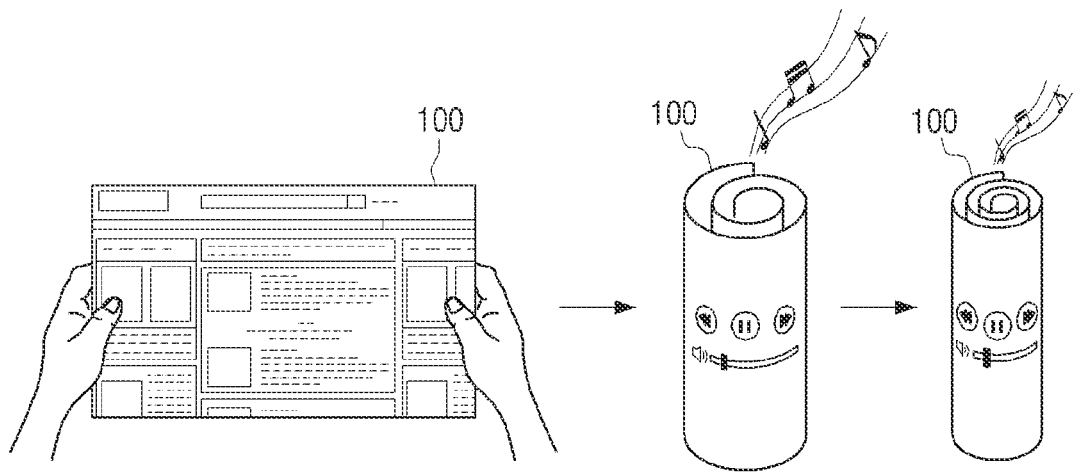
FIGS. 18A, 18B, 19A, 19B, 19C, 19D, 20A and 20B are views illustrating a method of controlling a flexible display device, according to another exemplary embodiment.

As shown in FIG. 18A, if a rolling manipulation is performed to have a rolling diameter greater than or equal to a preset threshold value when an application execution screen is displayed on a screen of the flexible display device 100, the flexible display device 100 may perform an audio function, e.g., a music player function.

Also, when an audio function is performed, a lower function, such as rewinding, fast-forwarding, stopping, pausing, playing, recording, audio track changing, or the like, may be performed according to at least one selected from a changed direction and a changed degree of a rolling axis.

For example, if a rolling diameter of the flexible display device 100 is reduced according to a user manipulation, a volume size of a sound output through the music player function may be reduced.

Figure 18B:
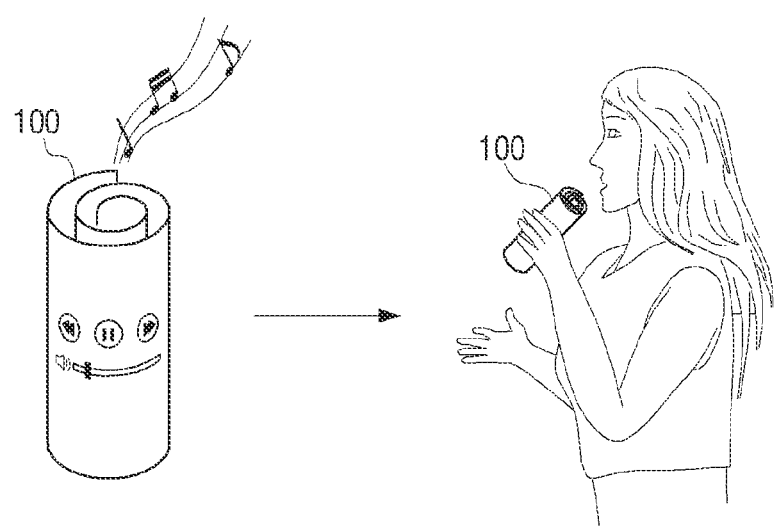

As shown in FIG. 18B, if the audio function, e.g., the music player function, is performed, and the rolling diameter is reduced according to a user manipulation when the flexible display device 100 is rolled, the flexible display device 100 may perform a microphone function.

When the microphone function is performed, another function, such as output audio amplifying, recording, or the like, may be performed based on the changed direction and/or the changed degree of the rolling axis.

Figure 19A:
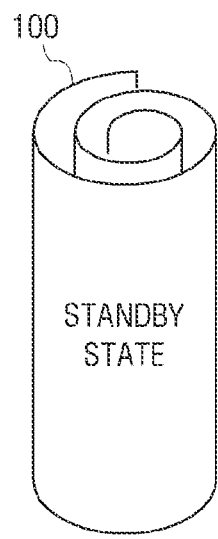
Figure 19B:
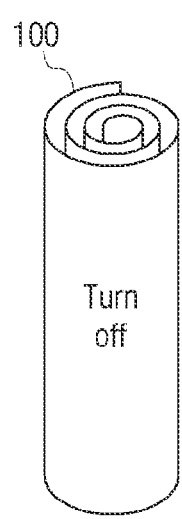

As shown in FIGS. 19A and 19B, a screen mode may be changed into a different state according to a rolling degree of the flexible display device 100.

For example, as shown in FIG. 19A, if the flexible display device 100 is rolled to have a rolling diameter smaller than a preset first threshold value, the flexible display device 100 may be changed into a standby state. Here, the standby state may be a screen off state, a screen locking state, a security screen state, or the like. The screen off state refers to a state in which a screen is turned off, and thus an input using information displayed on the screen is impossible. The screen locking state refers to a state in which the screen is turned on, but use of another function is impossible as long as there is no designated input. The security screen state refers to a state in which the user must perform a designated input in order to activate the screen.

As shown in FIG. 19B, if the flexible display device 100 is rolled to have a rolling diameter smaller than a second threshold value smaller than the first threshold value, the flexible display device 100 may be changed into a turn-off state. Here, the turn-off state may refer to a state in which power is turned off, and thus all inputs and outputs stop.

Figure 19C:
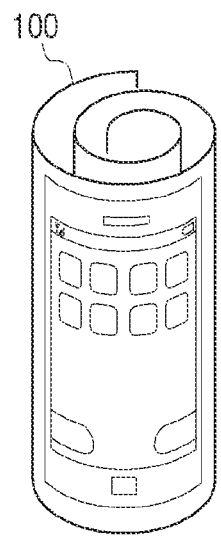
Figure 19D:
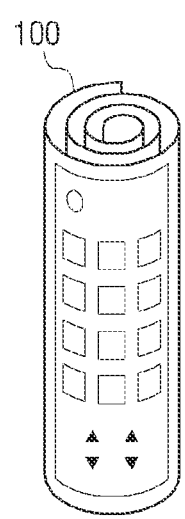

As shown in FIGS. 19C and 19D, the flexible display device 100 may perform different functions according to a rolling degree of the flexible display device 100 and provide UI screens corresponding to the different functions.

As shown in FIG. 19C, if the flexible display device 100 is rolled to have a rolling diameter smaller than a preset first threshold value, the flexible display device 100 may provide a call function and a phone UI corresponding to the call function. As shown in FIG. 19D, if the flexible display device 100 is rolled to have a rolling diameter smaller than a second threshold value which is smaller than the first threshold value, the flexible display device 100 may provide a remote control function and a remote control UI corresponding to the remote control function.

Figure 20A:
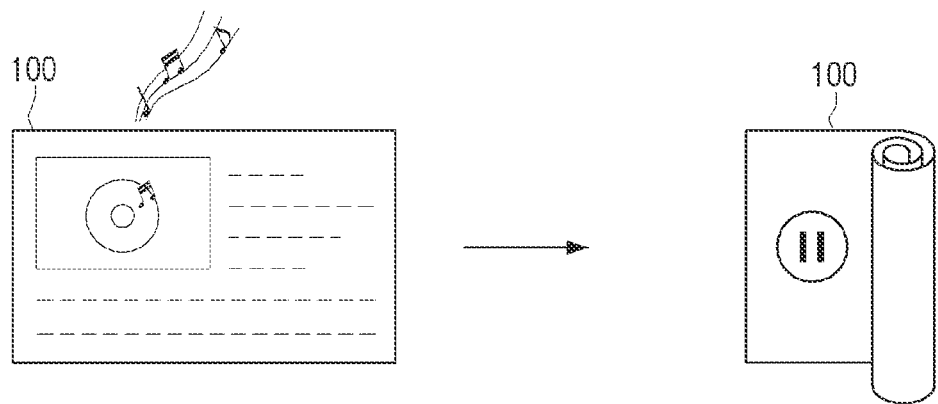
Figure 20B:
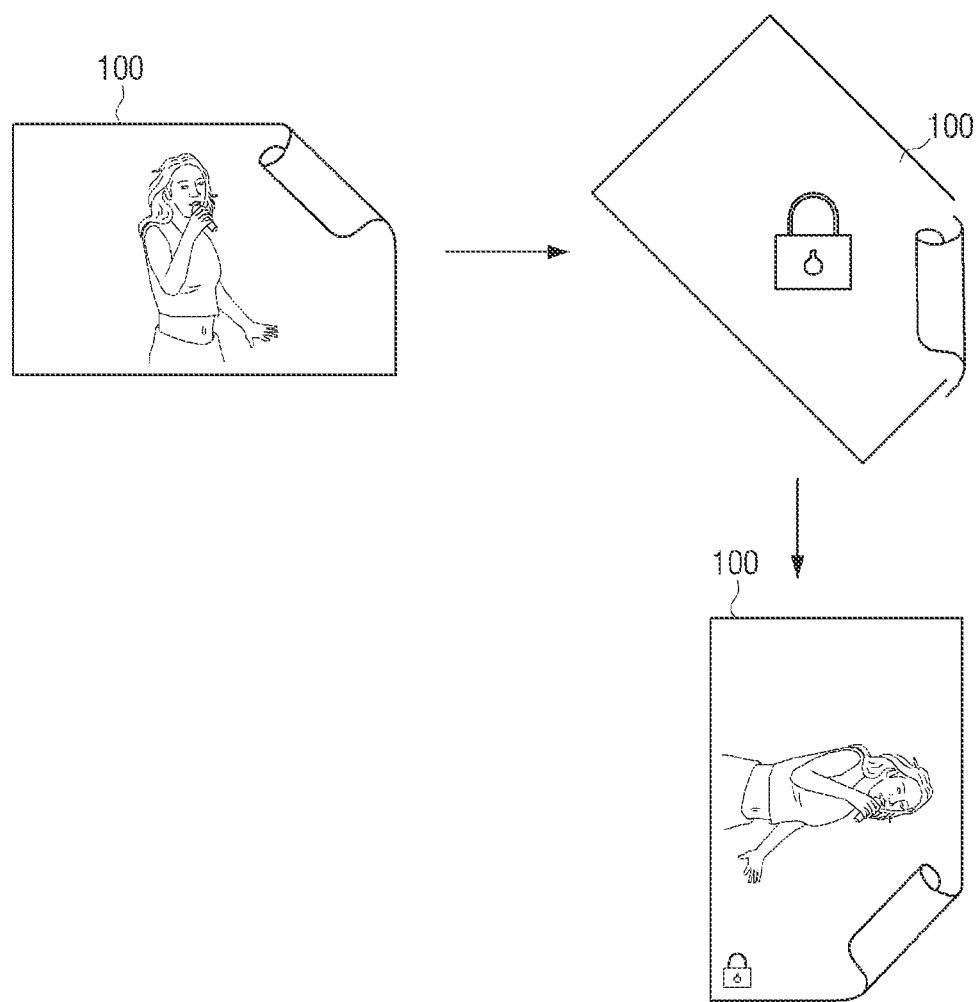

FIGS. 20A and 20B are views illustrating a method of controlling a flexible display device according to another exemplary embodiment.

As shown in FIG. 20A, if rolling a partial area of the flexible display device 100 is performed (i.e., partial rolling), a sub function of an existing function being performed on a current screen may be performed.

For example, if partial rolling for rolling a partial side area is performed when a music player function is performed in the flexible display device 100, a playback stop function of stopping music playback may be performed.

As shown in FIG. 20B, if partial rolling for rolling a partial area of the flexible display device 100 is performed, an additional function of a function performed on a current screen may be performed.

For example, if partial rolling for rolling a partial corner area is performed when a content is displayed in the flexible display device 100, a locking function of an automatic screen rotation function may be performed. In detail, although the flexible display device 100 rotates in a vertical direction when a screen is positioned in a horizontal direction, contents may not automatically rotate on the screen but may be kept positioned in the horizontal direction on the screen.

Figure 21A:
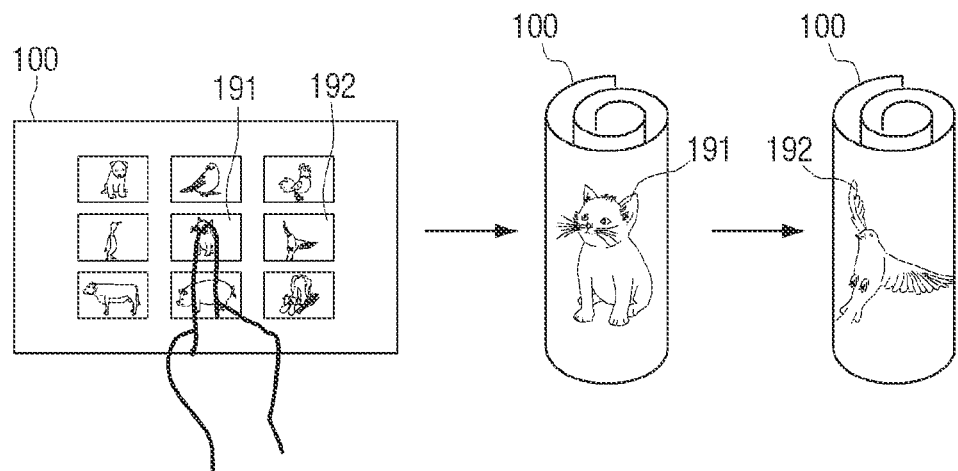
Figure 21B:
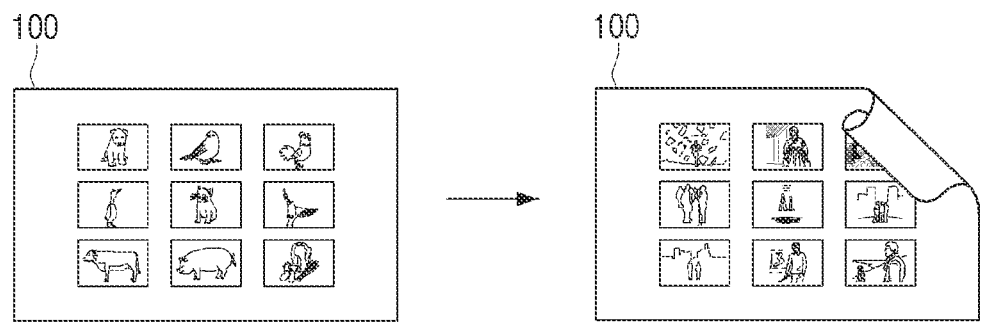

FIGS. 21A and 21B are views illustrating a method of controlling a flexible display device according to another exemplary embodiment.

As shown in FIG. 21A, if rolling an entire area of the flexible display device 100 is performed (e.g., whole rolling), a screen mode change function may be performed.

For example, if the whole rolling is performed when the flexible display device 100 displays a screen in a thumbnail mode for displaying a plurality of contents in thumbnail forms, the screen may be changed into a slide mode.

As shown in FIG. 21B, if a partial area of the flexible display device 100 is performed (e.g., partial rolling), a content change function may be performed while keeping a current screen mode.

For example, if the partial rolling for rolling the partial area is performed when the flexible display device 100 displays a screen in a thumbnail mode for displaying a plurality of contents belonging to a first folder in thumbnail forms, a plurality of contents belonging to a second folder may be displayed in thumbnail forms on the screen.

FIGS. 22A through 22D are views illustrating a screen that is displayed when unrolling is performed, according to an exemplary embodiment.

Figure 22A:
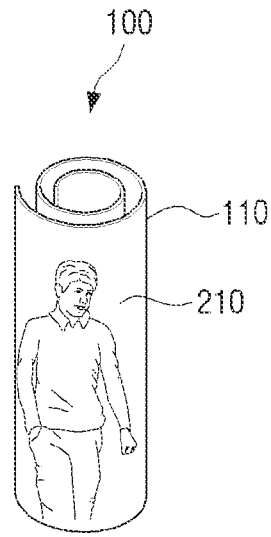
Figure 22B:
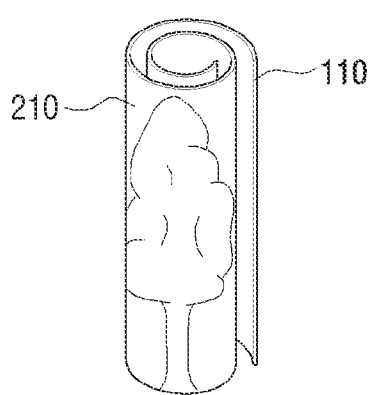

As shown in FIGS. 22A and 22B, an image 210 may be displayed on the display unit 110 that is exposed when being rolled. Here, FIG. 22B is a view illustrating the flexible display device 100 of FIG. 22A that rotates through 180° in a left direction.

Figure 22C:
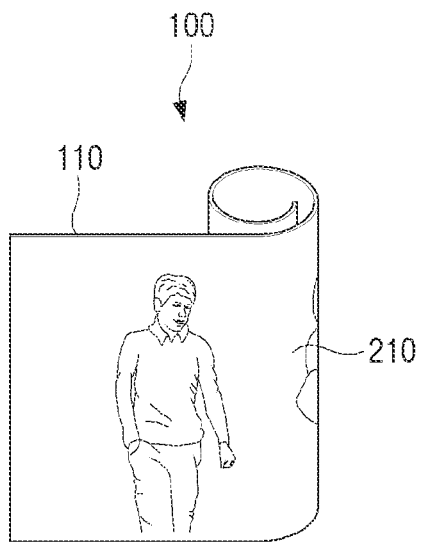
Figure 22D:
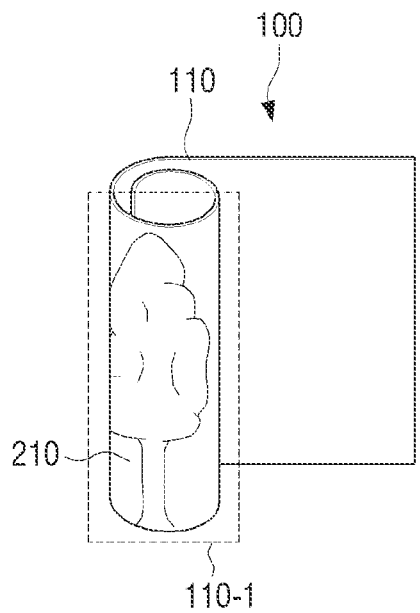

If the flexible display device 100 is unrolled, a screen may be displayed on the display unit 110 that is newly exposed according to the unrolling. In this case, when the flexible display device 100 is rolled, the flexible display device 100 may enlarge a size of the screen displayed on the display unit 110 by a size of an area having a flat state according to the unrolling. Therefore, as shown in FIGS. 22C and 22D, an image 210 may be displayed in an area 110-1 that is not exposed when being rolled, but is exposed when being unrolled.

If the display unit 110 is locally rolled toward an inner surface, a screen may be constituted and displayed to correspond to a size and a shape of another area except a bent area due to the rolling.

In detail, if the display unit 110 is partially rolled toward the inner surface, a display surface that is exposed when the partial rolling is performed may be determined, and a screen may be constituted to correspond to a size and a shape of the exposed display surface. If the display unit 110 is partially rolled toward the inner surface, the exposed display surface is not bent. Therefore, the control unit 130 may determine a size and a shape of the exposed display surface based on an area in which bend sensors or strain gauges outputting the same resistance values as in a flat state are distributed.

If the display unit 110 is locally rolled toward an outer surface, a screen may be constituted and displayed to correspond to a size and a shape of another area except a part of the inner surface of the display unit 110 touching the outer surface.

In detail, if the display unit 110 is partially rolled toward the outer surface, a display surface that is exposed by the partial rolling may be determined, and a screen may be constituted to correspond to a size and a shape of the exposed display surface. If the display unit 110 is partially rolled toward the outer surface, a part of the display surface touches a back surface of the display unit 110. Therefore, the size and the shape of the exposed display surface may be determined based on an area in which touch sensors that are arranged on the front surface and do not touch the back surface are arranged.

FIGS. 23A and 23B are views illustrating a method of displaying a screen if a display unit is partially rolled, according to an exemplary embodiment.

As shown in FIG. 23A, if the display unit 110 is partially rolled toward an inner surface, the flexible display device 100 may display an image 211 according to a size of an exposed display surface 210. As shown in FIG. 23B, if the display unit 110 is partially rolled toward an outer surface, the flexible display device 100 may display an image 221 according to a size of an exposed display surface 220.

As described above, the flexible display device 100 may display a screen according to a size of another part of a display surface except a part of the display surface covered by the partial rolling.

If the display unit 110 displays the screen when being rolled, a display position of the screen may be adjusted according to a preset standard. Here, the preset standard may be a position of the display surface watched by the user when the display unit 110 is rolled. In this case, an area being looked at by the user may be detected within the display unit 110 through a camera (not shown) for capturing the user. Here, the control unit 130 may trace a face direction of the user, motions of eyeballs of the user, or the like to detect the area looked at by the user.

FIGS. 24A through 24E are views illustrating a screen that is displayed when a double-sided display unit is unrolled, according to an exemplary embodiment.

Figure 24A:
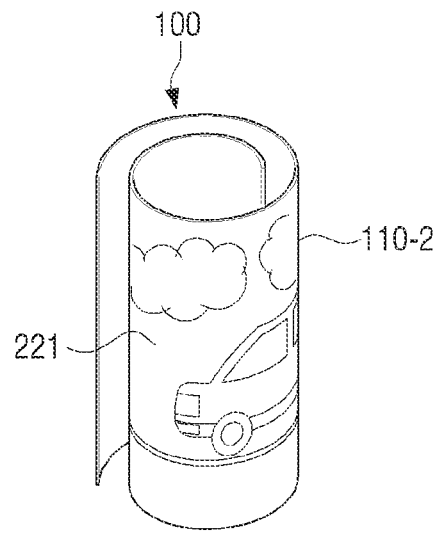
Figure 24B:
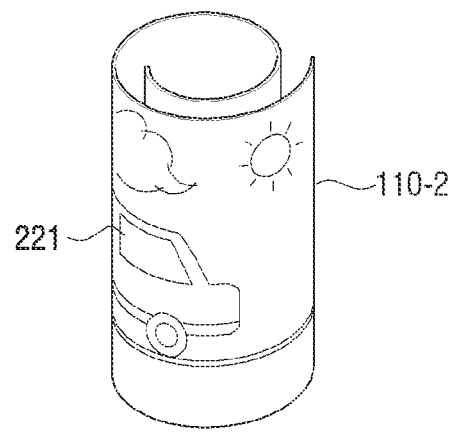

As shown in FIGS. 24A and 24B, an image 221 may be displayed in a first display area that is exposed by rolling of the display unit 110. Here, FIG. 24B is a view illustrating the flexible display device 100 of FIG. 24A that rotates through 180° in a left direction.

If the display unit 110 is unrolled, an image 221 displayed in a first display area 110-2 disappears from the first display area 110-2 and is displayed in a second display area 110-3.

Figure 24C:
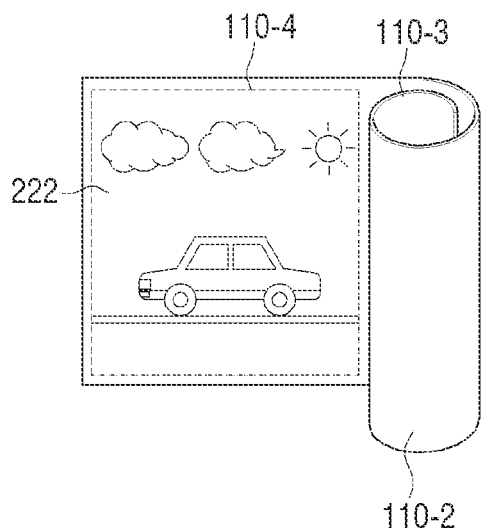

Here, as shown in FIG. 24C, the image 221 displayed in the first display area 110-2 is reduced according to a size of a second display area 110-4 that is newly exposed by the unrolling. An image 222 that is reduced may be displayed in the second display area 110-4 that is newly exposed.

Figure 24D:
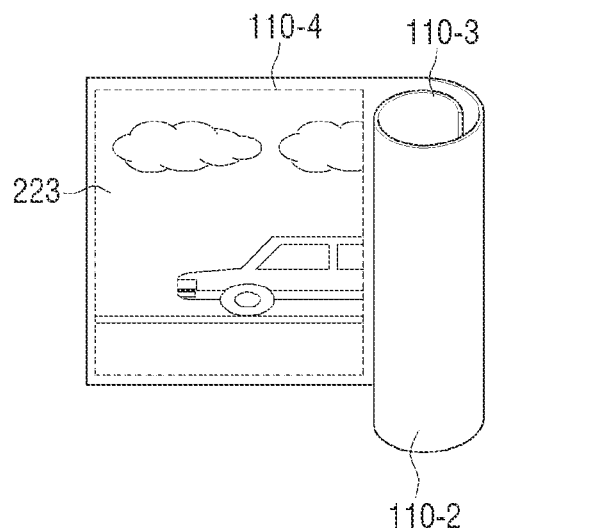
Figure 24E:
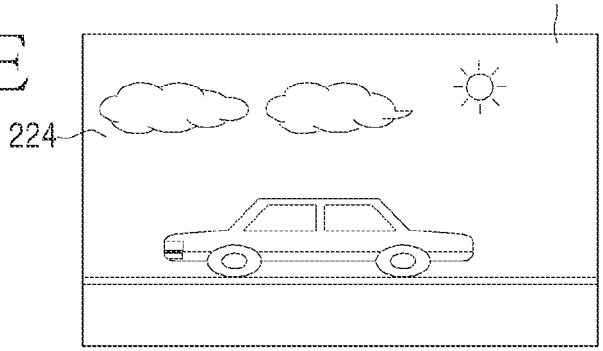

As shown in FIGS. 24D and 24E, a part 223 of an image may be displayed in the second display area 110-4 that is newly exposed by the unrolling. If the unrolling is completed, a whole image 224 may be displayed in a second display area 110-3.

Figure 25:
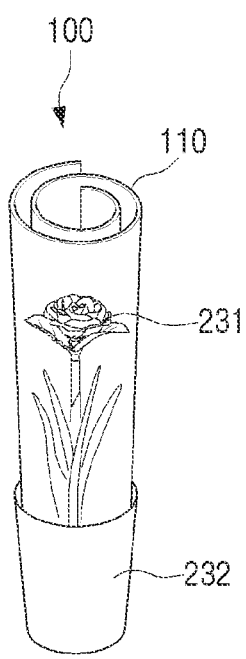

FIG. 25 is a view illustrating a method of controlling a flexible display device according to another exemplary embodiment.

FIG. 25 illustrates the display unit 110 that is wholly rolled toward an outer surface and then put into a support bracket (e.g., a cup) 232. In this case, the flexible display device 100 may display an image 231 according to a size of another area of a display surface except an area covered by the support bracket 232.

Figure 26:
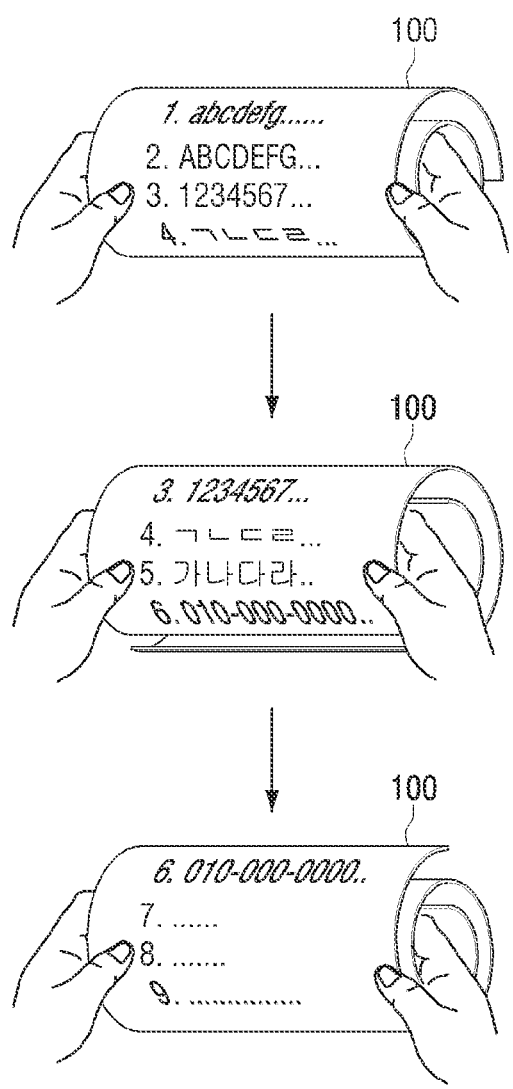

FIG. 26 is a view illustrating a method of controlling a flexible display device according to another exemplary embodiment.

As shown in FIG. 26, if a user manipulation of gripping and rotating both ends of the flexible display device 100 is performed when the flexible display device 100 is rolled, displayed information may be rotated and displayed according to a rotation direction of the flexible display device 100.

In this case, if information displayed in an exposed area is limited when the flexible display device 100 is rolled, new information that has not been displayed may be displayed according to the rotation of the flexible display device 100. A displayed speed or a displayed amount of the new information may vary in proportion to a rotation speed.

Figure 27A:
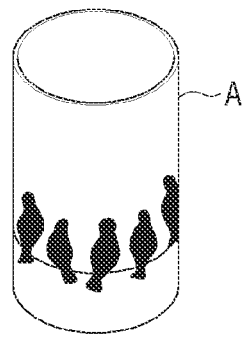
Figure 27B:
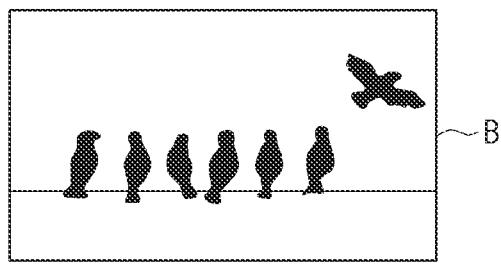

FIGS. 27A and 27B are views illustrating a method of controlling a flexible display device according to another exemplary embodiment of the present general inventive concept.

As shown in FIG. 27A, object A may have a cylindrical shape.

FIG. 27B illustrates an image that is formed in a flat shape by 3-dimensionally scanning the object A. In other words, object B may be 3-dimensionally scanned, i.e., may be scanned in a 360° direction, to form a 3D image.

Figure 27C:
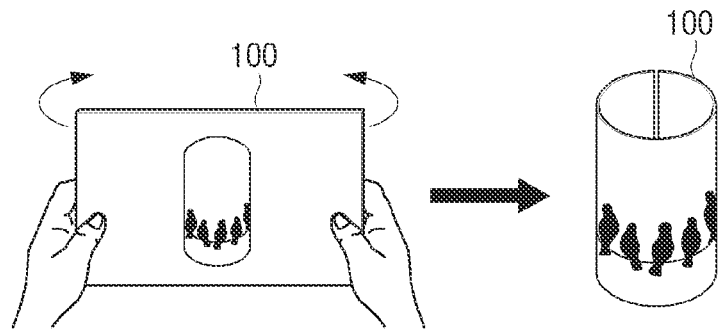

FIG. 27C illustrates display states when the flexible display device 100 is not bent and is bent into a cylindrical shape.

As shown with a left picture of FIG. 27C, if the flexible display device 100 is not bent, a 2D image of the object A may be displayed. As shown with a right picture of FIG.

27C, if the flexible display device 100 is bent into the cylindrical shape, an image of the object A may be 3-dimensionally displayed over the entire 360° of the display device.

In the above-described exemplary embodiment, a 3D image of an object is formed through 3-dimensional scanning but is not limited thereto. Therefore, the 3D image of the object may be formed as various shapes.

For example, the 3D image of the object may be formed according to a cylindrical projection principle. Here, the cylindrical projection principle refers to a principle of enclosing a particular object with a cylinder and unfolding the cylinder, i.e., a method of drawing all surfaces of a 3D object on a 2-D plane. In other words, the cylindrical projection principle refers to a perspective drawing method of covering the 3D object with the cylinder and then emitting light from a center of a 3D object to draw a surface of the 3D object projected onto the cylinder. A 3D image that uses the cylindrical projection principle may be formed through a 3D scanner as described above. The 3D scanner may 3-dimensionally scan an object, from which a 3D image is to be acquired, at several angles by using a laser or the like and process a plurality of formed scan images to transform the plurality of formed scan images into a cylindrical shape in order to form 3D graphic data. Alternatively, images that are acquired by capturing an object in two or more different directions may be attached to form a panorama image. In detail, the object may be captured in at least two directions to acquire a frame in order to acquire an image that is seen all around in a 360° direction. A background image may be removed from at least two acquired frames, and only an object image may be extracted and attached to acquire a panorama image of the corresponding object that is seen in the 360° direction.

For example, a 3D object may be captured in front and back directions to acquire two images, curved areas of the two acquired images may be unfolded on a plane to process the two acquired images, and the image-processed images may be attached to form one consecutive image. In this case, a fisheye lens that is a super-wide-angle lens having a view angle exceeding 180° may be used to acquire the captured images.

Figure 28A:
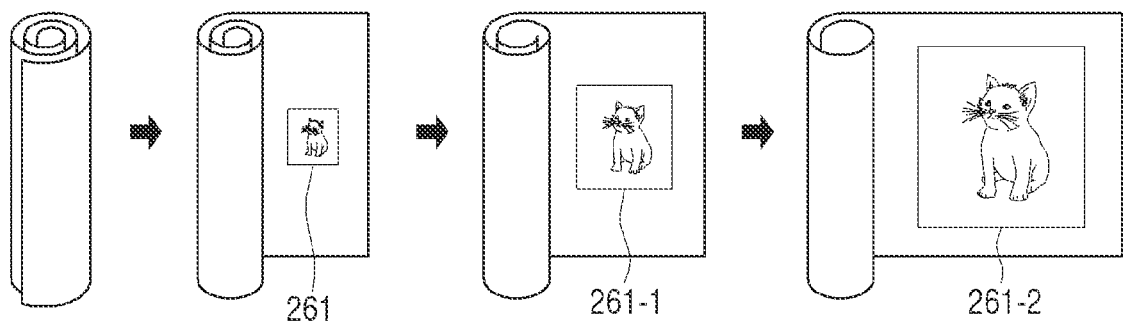
Figure 28B:
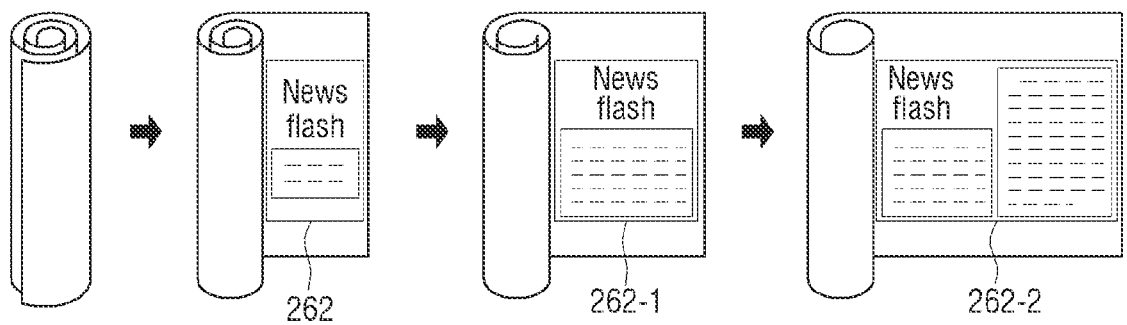
Figure 28C:
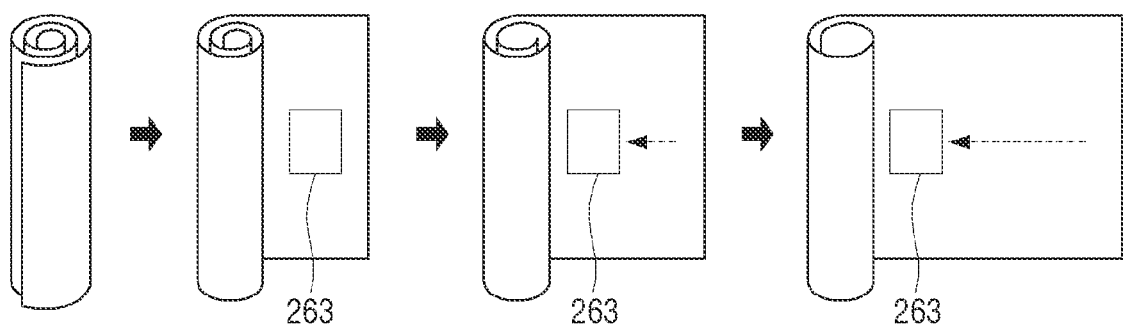

FIGS. 28A through 28C are views illustrating a method of controlling a flexible display device according to another exemplary embodiment.

As shown in FIGS. 28A through 28C, various types of graphic effects may be provided according to a manipulation of rolling the flexible display device 100.

As shown in FIG. 28A, if an unrolling manipulation is performed when the flexible display device 100 is rolled, there may be provided a graphic effect that changes a size of a content displayed in an exposed area according to a size of the area exposed by the unrolling. For example, as shown in FIG. 28A, the size of the content displayed in the exposed area may increase with an increase in the size of the area exposed by the unrolling.

As shown in FIG. 28B, if a unrolling manipulation is performed when the flexible display device 100 is rolled, there may be provided a graphic effect that changes an amount of information displayed in an exposed area according to a size of the area exposed by the unrolling. For example, as shown in FIG. 28B, the amount of the information displayed in the exposed area may increase with an increase in the size of the area exposed by the unrolling. Here, the amount of information may be the number of contents, details of contents, additional information, or the like.

As shown in FIG. 28C, if a unrolling manipulation is performed when the flexible display device 100 is rolled, there may be provided a graphic effect that changes a position of a content displayed in an exposed area according to a size of the area exposed by the unrolling. For example, as shown in FIG. 28C, a content displayed in a first exposed area may slide into a newly exposed area to be displayed according to a change in the area exposed by the unrolling.

Figure 29:
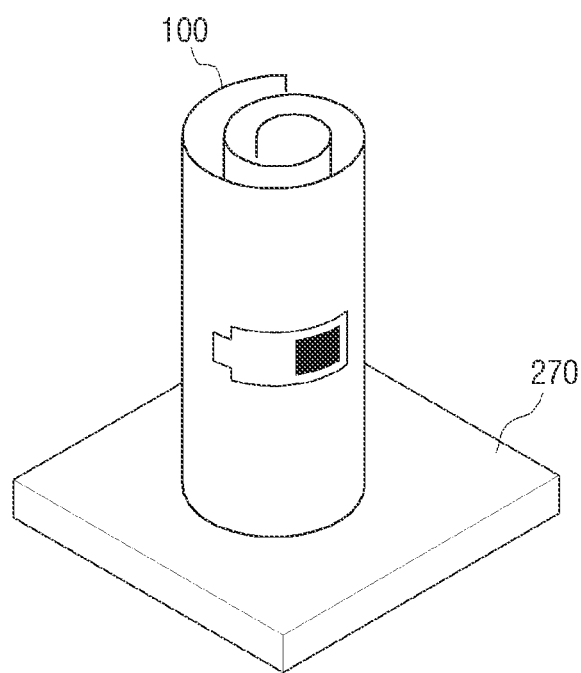

FIG. 29 is a view illustrating a method of controlling a flexible display device according to another exemplary embodiment.

As shown in FIG. 29, the flexible display device 100 may be rolled into a shape for being installed on a charger 270 to be charged. When the flexible display device 100 may be rolled to be charged, the flexible display device 100 may display a charging state on a screen.

Figure 30:
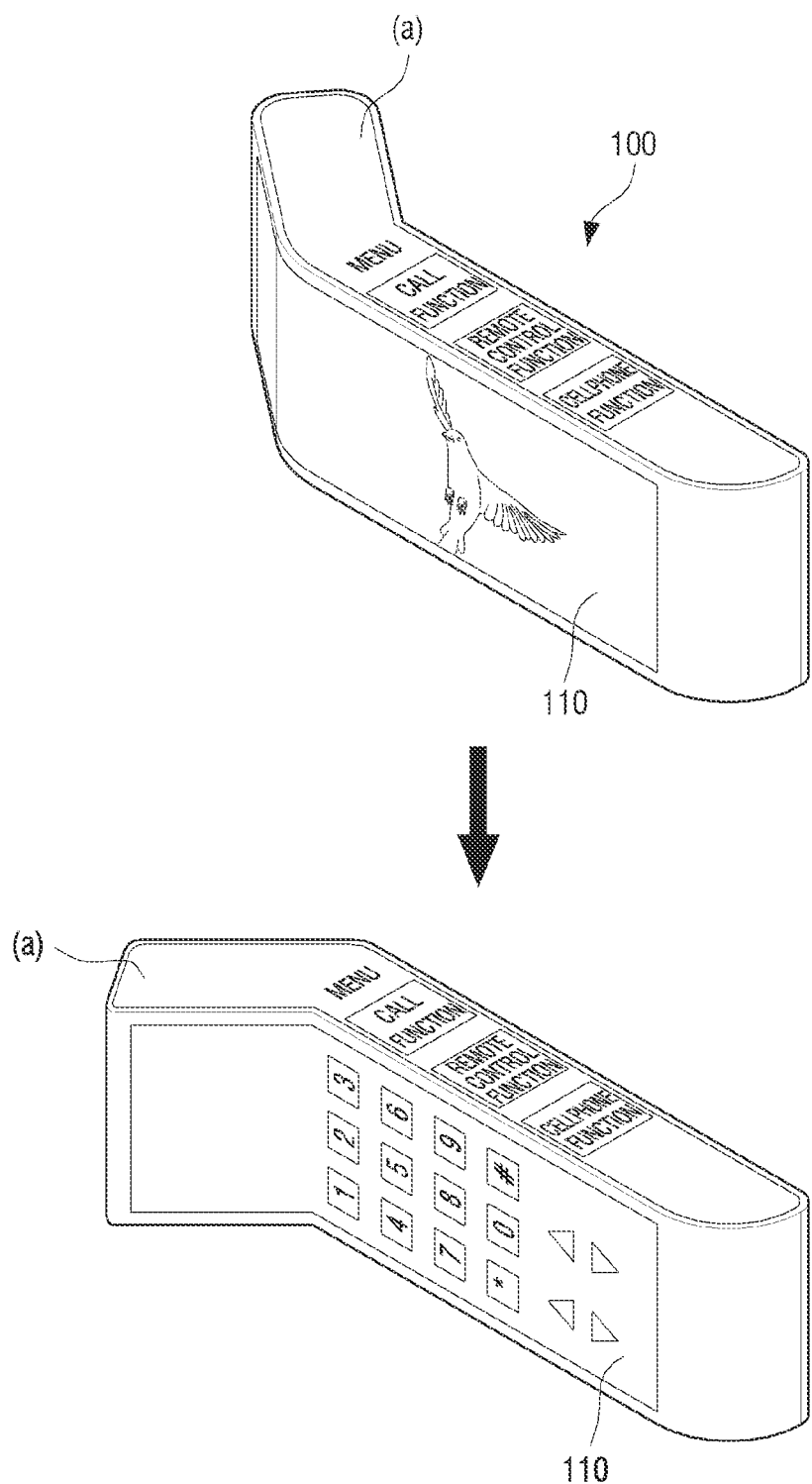
FIGS. 30 and 31 are views illustrating flexible display devices, according to various exemplary embodiments.

FIG. 30 illustrates the flexible display device 100 that is realized as a 3D display device not as a flat-panel display device. Referring to FIG. 30, the display unit 110 is provided on a surface of the flexible display device 100, and various types of pieces of hardware, such as buttons, a speaker, a microphone, an IR lamp, etc., are provided on another surface.

An entire part or a part of an outer case of the flexible display device 100 as shown in FIG. 30 may be formed of rubber or other types of polymer resins to be flexibly bent. Therefore, a whole part or a part of the flexible display device 100 may have a flexible characteristic.

The flexible display device 100 may perform a new operation different from a previous operation according to a bending input. For example, the flexible display device 100 may perform a remote control function of controlling an external device in ordinary times but may perform a call function if a bending gesture is made in an area. When the remote control function is performed, a remote control button may be displayed on the display unit 110. If the call function is performed, a dial pad may be displayed on the display unit 110.

Figure 31:
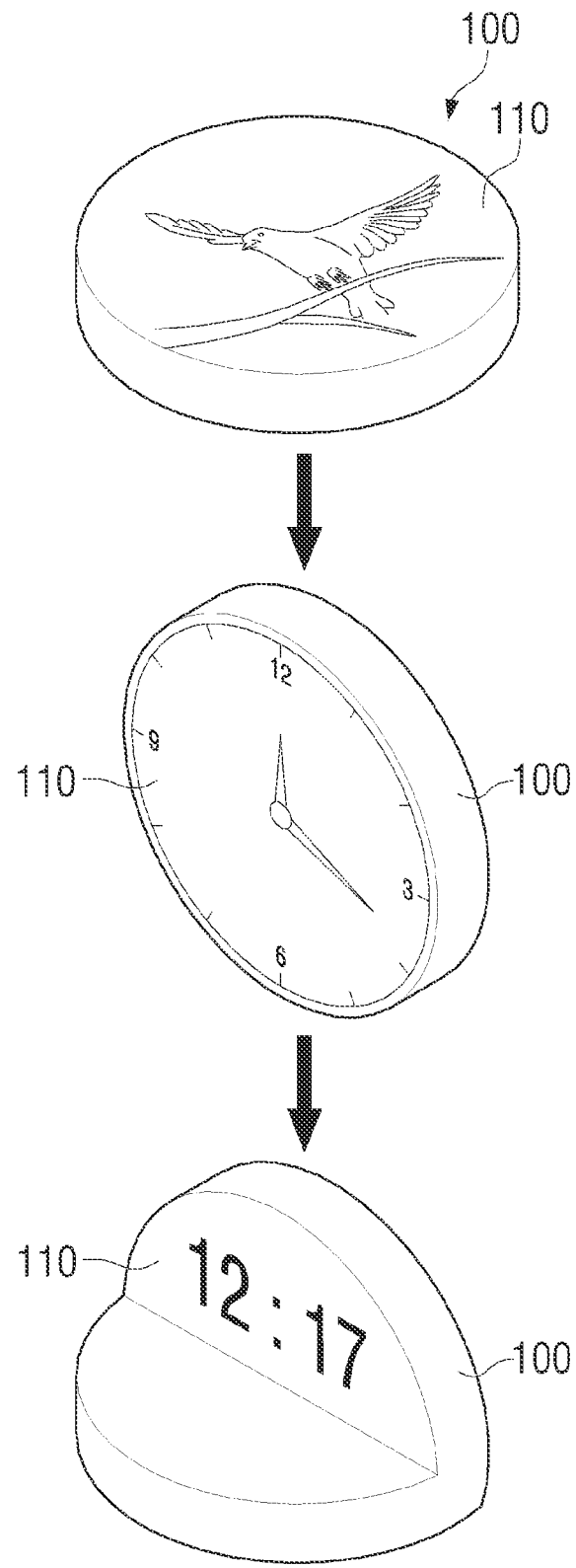

FIG. 31 illustrates the flexible display device 100 that is realized in a circle shape. Therefore, the flexible display device 100 may perform visually and functionally different operations according to a placed shape or a folded shape. For example, when the flexible display device 100 is horizontally placed on a floor, the flexible display device 100 may display other contents. If the flexible display device 100 stands vertically on the floor, the flexible display device 100 may perform a table clock function. Alternatively, if a central part of the flexible display device 100 is bent about 90°, the flexible display device 100 may perform a notebook PC function. In this case, the flexible display device 100 may display a soft keyboard in one of folded areas and display a display window in the other area.

The flexible display device 100 may be realized as various types.

Figure 32:
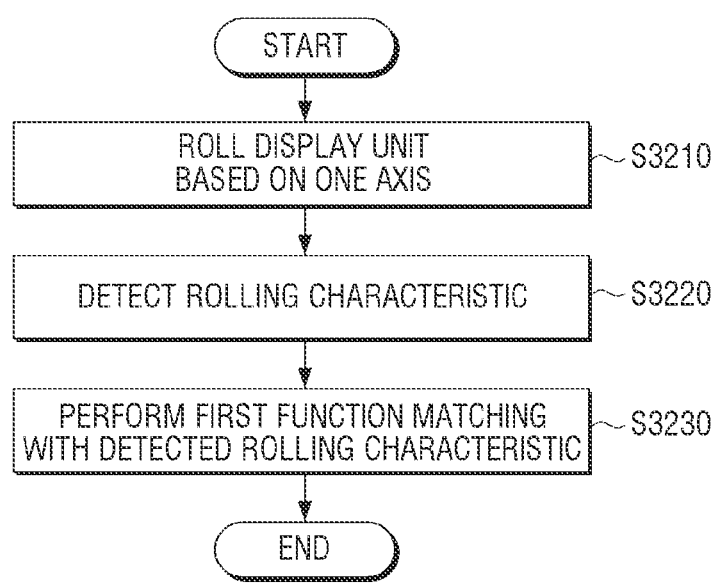
FIG. 32 is a flowchart illustrating a method of controlling a flexible display device, according to an exemplary embodiment.

FIG. 32 is a flowchart illustrating a method of controlling a flexible display device according to an exemplary embodiment.

Referring to FIG. 32, if a display unit is rolled in operation S3210, at least one rolling characteristic is detected in operation S3220. Here, the rolling characteristic may include at least one selected from a rolling diameter of the display unit, and a size, a position, and a shape of an exposed area.

In operation S3230, the flexible display device performs a first function of the flexible display device that is performable in a rolling mode determined according to the detected rolling characteristic. Here, the rolling mode may include a conic shape, a cylindrical shape, a partially rolling shape, a wholly rolling shape, etc. For example, if an entire area of the flexible display device is rolled, and a rolling diameter of the flexible display device is uniform, the rolling mode may be determined in the cylindrical shape. In this case, the flexible display device may perform a function that is performable in the rolling mode of the cylindrical shape.

In this case, a display unit may be rolled based on one axis.

Also, if the rolling diameter is changed by a user when the display unit is rolled, the flexible display device may perform a second function corresponding to the changed rolling diameter.

Also, if the display unit includes a plurality of rolling areas, the flexible display device may detect rolling diameters respectively corresponding to the plurality of rolling areas. If at least one selected from the rolling diameters respectively corresponding to the plurality of rolling areas is changed when the display unit is rolled, the flexible display device may perform a third function corresponding to the changed rolling diameter.

If whole rolling for rolling an entire area of the display unit is sensed, the flexible display device may perform a fourth function. If partial rolling for rolling a partial area of the display unit is sensed, the flexible display device may perform a fifth function. Here, the fourth function may be a screen mode change function, and the fifth function may be a sub-function of a content displayed on the display unit.

Also, if at least a partial area of the display unit is exposed according to a manipulation of unrolling the display unit, the flexible display device may reconstitute an image according to a size of the exposed partial area and may display the image in the exposed partial area.

The method of controlling the flexible display device, etc. according to the above-described various exemplary embodiments may be realized as programs to be provided to the flexible display device.

In detail, there may be provided a non-transitory computer readable medium that stores a program performing an operation of detecting a rolling characteristic if a display unit is rolled and an operation of performing a first function of the flexible display device that is performable in a rolling mode determined by the detected rolling characteristic.

The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a compact disk (CD), a digital versatile disk (DVD), a hard disk, a blue-ray disk, a universal serial bus (USB), a memory card, a read-only memory (ROM), or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

The invention claimed is:

1. A flexible display device comprising:
   a display;
   at least one sensor; and
   at least one controller configured to:
   based on a folding of the display being detected by the at least one sensor, identify a plurality of areas of the display divided according to the folding of the display, and
   control the display to display a first screen corresponding to a first function in a first area among the plurality of areas and display a second screen corresponding to a second function different from the first function in a second area among the plurality of areas,
   wherein the at least one controller is further configured to:
   while the display is unfolded, detect a state of the display by the at least one sensor;
   based on the detected state of the display being a first state while the display is unfolded, control the display to display a third screen; and
   based on the detected state of the display being a second state while the display is unfolded, control the display to display a fourth screen, the second state being different from the first state, and
   wherein the third screen corresponds to a third function and the fourth screen corresponds to a fourth function different from the third function.

2. The flexible display device of claim 1, wherein the at least one controller is further configured to:
   receive a user command while the display is folded,
   based on the user command being received in the first area, control the display to display a screen corresponding to a function executed by the user command in the first area, and
   based on the user command being received in the second area, control the display to display the screen corresponding to the function executed by the user command in the second area.

3. The flexible display device of claim 1, wherein the first screen is controlled by a first application corresponding to the first function and the second screen is controlled by a second application corresponding to the second function.

4. The flexible display device of claim 1, wherein the first screen comprises a soft keyboard and the second screen comprises a content corresponding to a function executed according to a user command input on the soft keyboard.

5. The flexible display device of claim 1, wherein the at least one controller is further configured to:
   identify a folding angle of the display, and
   control the display to display different screens on the plurality of areas based on the identified folding angle being corresponded to a predetermined angle.

6. The flexible display device of claim 1, wherein
   the first state is a horizontal state, and
   the second state is a vertical state.

7. The flexible display device of claim 6, wherein one of the third and fourth function is a clock function.

8. A method of controlling a flexible display device, the method comprising:
   based on a folding of a display of the flexible display device being detected, identifying a plurality of areas of the display divided according to the folding of the display; and
   displaying a first screen corresponding to a first function in a first area among the plurality of areas and displaying a second screen corresponding to a second function different from the first function in a second area among the plurality of areas,
   wherein the method further comprises:
   while the display is unfolded, detecting a state of the display by at least one sensor of the flexible display device;

based on the detected state of the display being a first state while the display is unfolded, displaying a third screen on the display; and based on the detected state of the display being a second state while the display is unfolded, displaying a fourth screen on the display, the second state being different from the first state, and wherein the third screen corresponds to a third function and the fourth screen corresponds to a fourth function different from the third function.

9. The method of claim 8, further comprising:

receiving a user command while the display is folded, based on the user command being received in the first area, displaying a screen corresponding to a function executed by the user command in the first area, and based on the user command being received in the second area, displaying the screen corresponding to the function executed by the user command in the second area.

10. The method of claim 8, wherein the first screen is controlled by a first application corresponding to the first function and the second screen is controlled by a second application corresponding to the second function.

11. The method of claim 8, wherein the first screen comprises a soft keyboard and the second screen comprises a content corresponding to a function executed according to a user command input on the soft keyboard.

12. The method of claim 8, further comprising:

identifying a folding angle of the display, and displaying different screens on the plurality of areas based on the identified folding angle being corresponded to a predetermined angle.

13. The method of claim 8, wherein the first state is a horizontal state, and the second state is a vertical state.

14. The method of claim 13, wherein one of the third and fourth function is a clock function.

* * * * *